US012699680B2

(12) United States Patent

He et al.

(10) Patent No.: US 12,699,680 B2
(45) Date of Patent: Aug. 4, 2026

(54) UNSUPERVISED ERROR DETECTION IN DATA TABLES USING SEMANTIC-DOMAIN CONSTRAINTS

(71) Applicant: Microsoft Technology Licensing, LLC, Redmond, WA (US)

(72) Inventors: Yeye He, Bellevue, WA (US); Surajit Chaudhuri, Kirkland, WA (US); Dongmei Zhang, Beijing (CN); Haidong Zhang, Beijing (CN); Weiwei Cui, Beijing (CN); Song Ge, Beijing (CN); Qixu Chen, Hong Kong (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/005,793

(22) Filed: Dec. 30, 2024

(65) Prior Publication Data

US 2026/0187041 A1    Jul. 2, 2026

(51) Int. Cl.
*G06F 16/00* (2019.01)
*G06F 16/215* (2019.01)

(52) U.S. Cl.
CPC .................................. *G06F 16/215* (2019.01)

(58) Field of Classification Search
None
See application file for complete search history.

(56) References Cited

PUBLICATIONS

Zhao et al. (CN-112347095-A), "Processing Method, Device And Server Of Data Table", 2021-0209, 24 Pages. (Year: 2021).*

Pang et al. (CN-112988780-A), "Data Checking Method And Device, Storage Medium And Electronic Device", Jun. 18, 2021, 15 Pages. (Year: 2021).*
Lu et al. (CN-110945538-A), "Automatic Rule Recommendation Engine", Mar. 31, 2020, 13 Pages. (Year: 2020).*
Suen et al. (TW-442761-B), "Automatic Correction Method And System For Information Of Form", Jun. 23, 2001, 12 Pages. (Year: 2001).*
"Automatic-Data-Repair", Retrieved From: https://github.com/WelkinNi/Automatic-Data-Repair/tree/main/data_with_rules, Retrieved on: Jul. 14, 2025, 2 Pages.
"Clean Data in Excel", Retrieved From: https://support.microsoft.com/en-us/office/clean-data-in-excel-7fe20d89-3f57-46d3-b659-e8f3ee853bda?ns=XLWAENDUSER&version=16, Retrieved on: Jul. 15, 2025, 5 Pages.
"Clean", Retrieved From: https://docs.dataprep.ai/user_guide/clean/introduction.html#userguide-clean, Retrieved on: Jul. 15, 2025, 6 Pages.

(Continued)

*Primary Examiner* — Bai D Vu

(74) *Attorney, Agent, or Firm* — Ray Quinney & Nebeker P.C.; James S. Bullough

(57) ABSTRACT

Systems and methods discussed herein generate a semantic-domain constraint corpus that detects data errors within columns of any data table, without requiring domain-experts to manually specify constraints on a per-table basis. A large body of semantic-domain constraint candidates is generated from test datasets, after which high-quality constraints within those candidates are identified. The systems and methods further pare the remaining semantic-domain constraints down based on size and false-positive rate constraints. The resulting semantic-domain constraint corpus can be applied to any structured dataset to automatically detect errors within columns of that dataset.

17 Claims, 9 Drawing Sheets

(56) References Cited

PUBLICATIONS

"Luhn algorithm", Retrieved From: https://en.wikipedia.org/wiki/Luhn_algorithm, Retrieved on: Jul. 15, 2025, 4 Pages.

"Microsoft Excel", Retrieved From: https://www.microsoft.com/en-us/microsoft-365/excel, Retrieved on: Jul. 15, 2025, 9 Pages.

"Online, collaborative spreadsheets", Google Sheets, Retrieved From: https://workspace.google.com/products/sheets/#gemini-in-sheets, Retrieved on: Jul. 15, 2025, 11 Pages.

"Optimization and root finding (scipy.optimize)", Retrieved From: https://docs.scipy.org/doc/scipy/reference/optimize.html, Retrieved on: Jul. 15, 2025, 11 Pages.

"python-validators/validators", Retrieved From: https://github.com/python-validators/validators/, Retrieved on: Jul. 15, 2025, 3 Pages.

Baeza-Yates et al., "Modern Information Retrieval", In ACM Press, vol. 463, Jan. 1999, 103 pages.

Berti-Equille, et al., "Discovery of Genuine Functional Dependencies from Relational Data with Missing Values", In Proceedings of the VLDB Endowment, vol. 11, No. 8, Apr. 2018, pp. 880-892.

Beskales, et al., "On the Relative Trust between Inconsistent Data and Inaccurate Constraints" In Repository of arXiv:1207.5226v2, Jul. 24, 2012, 12 Pages.

Bishop, et al., "Pattern Recognition and Machine Learning", In Publication of Springer, Feb. 2006, 375 Pages.

Brown, et al., "Language Models Are Few-shot Learners", In 34th Conference on Neural Information Processing Systems, 2020, 25 Pages.

Chen, et al., "Auto-Test: Learning Semantic-Domain Constraints for Unsupervised Error Detection in Tables", Proceedings of the ACM on Management of Data, vol. 3, No. 3, Article 133, Jun. 18, 2025, 27 Pages.

Chu, et al., "Holistic Data Cleaning: Putting Violations Into Context", 29th International Conference on Data Engineering (ICDE), IEEE, 2013, 12 Pages.

Chu, et al., "KATARA: A Data Cleaning System Powered by Knowledge Bases and Crowdsourcing," In Proceedings of the 2015 Acm Sigmod International Conference on Management of Data, 2015, 15 Pages.

Chu, et al., "RULEMINER: Data Quality Rules Discovery", 30th International Conference on Data Engineering. IEEE, 2014, 4 Pages.

Cohen, Jacob, "Statistical power analysis for the behavioral sciences", In Journal of Routledge, May 13, 2013, 579 Pages.

Fan, et al., "Discovering Conditional Functional Dependencies", IEEE Transactions on Knowledge and Data Engineering, vol. 23, No. 5, 2010, pp. 683-698.

Feige, et al., "A Threshold of Ln N for Approximating Set Cover", Journal of the ACM (JACM), vol. 45, No. 4, Jul. 1, 1998, pp. 634-652.

Feuer, et al., "ArcheType: A Novel Framework for Open-Source Column Type Annotation using Large Language Models", In Repository of arXiv preprint arXiv:2310.18208, Aug. 19, 2024, 18 Pages.

Gao, et al., "A Hybrid Data Cleaning Framework using Markov Logic Networks", IEEE Transactions on Knowledge and Data Engineering, vol. 34, No. 5, Jul. 28, 2020, 14 Pages.

Heidari, et al., "HoloDetect: Few-Shot Learning for Error Detection", Proceedings of the 2019 International Conference on Management of Data, Jun. 25, 2019, pp. 829-846.

Hellerstein, Joseph. M., "Quantitative Data Cleaning for Large Databases", In Journal of United Nations Economic Commission for Europe, Feb. 27, 2008, 42 Pages.

Huang, et al., "Auto-Detect: Data-Driven Error Detection in Tables", Proceedings of the 2018 International Conference on Management of Data, May 27, 2018, 16 pages.

Huhtala, et al., "TANE: An Efficient Algorithm for Discovering Functional and Approximate Dependencies", The Computer Journal, vol. 42, No. 2, 1999, pp. 100-111.

Hulsebos, et al., "AdaTyper: Adaptive Semantic Column Type Detection", In Repository of arXiv preprint arXiv:2311.13806, Nov. 23, 2023, 9 Pages.

Hulsebos, et al., "Sherlock: A Deep Learning Approach to Semantic Data Type Detection", In Proceedings of the 25th ACM SIGKDD International Conference on Knowledge Discovery & Data Mining, Jul. 25, 2019, pp. 1500-1508.

Ilyas, et al., "Extracting Syntactic Patterns from Databases", In 34th International Conference on Data Engineering (ICDE), IEEE, 2018, pp. 41-52.

Kelley, et al., "On Effect Size", Psychological methods, vol. 17, No. 2, Jun. 2012, pp. 137-152.

Khayyat, et al., "BigDansing: A System for Big Data Cleansing", Proceedings of the 2015 ACM SIGMOD international conference on management of data, May 27, 2015, 16 Pages.

Li, et al., "Table-GPT: Table-tuned GPT for Diverse Table Tasks", In Repository of arXiv preprint arXiv:2310.09263v1, Oct. 13, 2023, 47 Pages.

Mahdavi, et al., "Baran: Effective Error Correction via a Unified Context Representation and Transfer Learning", Proceedings of the VLDB Endowment, vol. 13, No. 11, Jul. 1, 2020, pp. 1948-1961.

Mahdavi, et al., "Raha: A Configuration-Free Error Detection System", In Proceedings of the International Conference on Management of Data (SIGMOD), Jun. 25, 2019, pp. 865-882.

Mikolov, et al., "Efficient Estimation of Word Representations in Vector Space", In Repository of arXiv:1301.3781, Sep. 7, 2013, 12 pages.

Mintz, et al., "Distant Supervision for Relation Extraction without Labeled Data", In Proceedings of the Joint conference of the 47th Annual Meeting of the ACL and the 4th International Joint Conference on Natural Language processing of the AFNLP, Aug. 2, 2009, pp. 1003-1011.

Narayan, et al., "Can Foundation Models Wrangle Your Data?", In Repository of arXiv preprint arXiv:2205.09911v2, Dec. 24, 2022, 12 Pages.

Naumann, Felix., "Data Profiling Revisited", In Journal of Acm Sigmod Record, vol. 42, No. 4, Feb. 28, 2014, pp. 40-49.

Ni, et al., "Automatic Data Repair: Are We Ready to Deploy?", In Repository of arXiv:2310.00711v1, Oct. 1, 2023, 14 Pages.

Peng, et al., "DataPrep. EDA: Task-Centric Exploratory Data Analysis for Statistical Modeling in Python", Proceedings of the 2021 International Conference on Management of Data, Jun. 18, 2021, pp. 2271-2280.

Pennington, et al., "GloVe: Global Vectors for Word Representation", In Proceedings of the Conference on Empirical Methods in Natural Language Processing, 2014, pp. 1532-1543.

Reimers, et al., "Sentence-BERT: Sentence Embeddings Using Siamese BERT-Networks", In Repository of arXiv:1908.10084v1, Aug. 27, 2019, 11 Pages.

Rekatsinas, et al., "HoloClean: Holistic Data Repairs with Probabilistic Inference", In Repository of arXiv preprint arXiv:1702.00820, Feb. 2, 2017, 13 Pages.

Song, et al., "Auto-Validate: Unsupervised Data Validation Using Data-Domain Patterns Inferred from Data Lakes", In Proceedings of the 2021 International Conference on Management of Data, Jun. 18, 2021, pp. 1678-1691.

Surdeanu, et al., "A Simple Distant Supervision Approach for the TAC-KBP Slot Filling Task.", TAC, 2010, 6 Pages.

Weber, Ryan., "Analyzing petabytes of data just got easier, with Google Sheets", Retrieved From: https://workspace.google.com/blog/product-announcements/connected-sheets-is-generally-available, Jul. 1, 2020, 9 Pages.

* cited by examiner

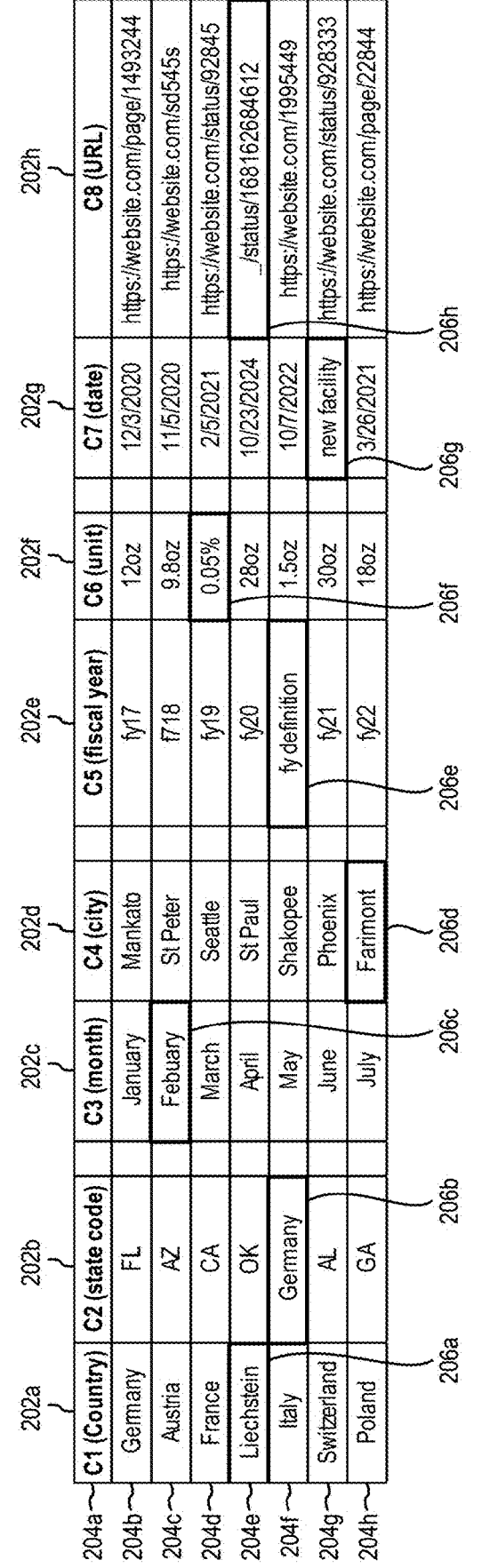

| | C1 (Country) | C2 (state code) | C3 (month) | C4 (city) | C5 (fiscal year) | C6 (unit) | C7 (date) | C8 (URL) |
|---|---|---|---|---|---|---|---|---|
| 204a | | | | | | | | |
| 204b | Germany | FL | January | Mankato | fy17 | 12oz | 12/3/2020 | https://website.com/page/1493244 |
| 204c | Austria | AZ | Febuary | St Peter | f718 | 9.8oz | 11/5/2020 | https://website.com/sd545s |
| 204d | France | CA | March | Seattle | fy19 | 0.05% | 2/5/2021 | https://website.com/status/92845 |
| 204e | Liechstein | OK | April | St Paul | fy20 | 28oz | 10/23/2024 | _/status/16816284612 |
| 204f | Italy | Germany | May | Shakopee | fy definition | 1.5oz | 10/7/2022 | https://website.com/1995449 |
| 204g | Switzerland | AL | June | Phoenix | fy21 | 30oz | new facility | https://website.com/status/928333 |
| 204h | Poland | GA | July | Farimont | fy22 | 18oz | 3/26/2021 | https://website.com/page/22844 |

Server(s) *112*

Memory *106*

Unsupervised Error Detection System *102*

Semantic-Domain Constraint Learning Manager
*402*

Semantic-Domain Constraint Quality Manager
*404*

Semantic-Domain Constraint Selection Manager
*406*

Semantic-Domain Constraint Application Manager
*408*

Semantic-Domain
Constraint Corpus *104*

Additional Items
*108*

Processor(s)
*110*

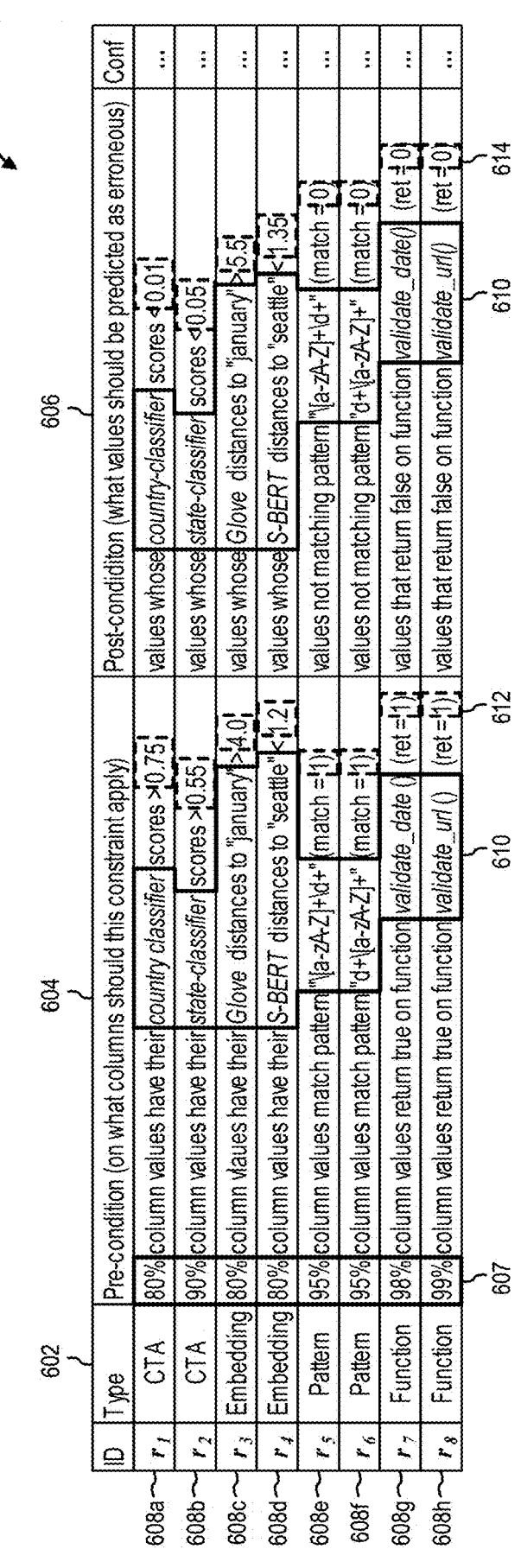

| ID | Type | Pre-condition (on what columns should this constraint apply) | Post-condition (what values should be predicted as erroneous) | Conf |
|---|---|---|---|---|
| $r_1$ | CTA | 80% column values have their *country classifier* [scores >0.75] | values whose *country-classifier* scores <0.01 | ... |
| $r_2$ | CTA | 90% column values have their *state-classifier* [scores >0.55] | values whose *state-classifier* scores <0.05 | ... |
| $r_3$ | Embedding | 80% column vlaues have their *Glove* distances to "january" >4.0 | values whose *Glove* distances to "january" >5.5 | ... |
| $r_4$ | Embedding | 80% column values have their *S-BERT* distances to "seattle" <1.2 | values whose *S-BERT* distances to "seattle" <1.35 | ... |
| $r_5$ | Pattern | 95% column values match pattern "[a-zA-Z]+\d+" [match =1] | values not matching pattern "[a-zA-Z]+\d+" [match =0] | ... |
| $r_6$ | Pattern | 95% column values match pattern "d+\[a-zA-Z]+" [match =1] | values not matching pattern "d+\[a-zA-Z]+" [match =0] | ... |
| $r_7$ | Function | 98% column values return true on function *validate_date* () [ret =1] | values that return false on function *validate_date()* [ret =0] | ... |
| $r_8$ | Function | 99% column values return true on function *validate_url* () [ret =1] | values that return false on function *validate_url()* [ret =0] | ... |

|  | Cover | Not Cover |
|---|---|---|
| Trigger | $\lvert C^{r}_{C,T} \rvert = 10$ | $\lvert C^{r}_{\overline{C},T} \rvert = 160{,}000$ |
| Not Trigger | $\lvert C^{r}_{C,\overline{T}} \rvert = 990$ | $\lvert C^{r}_{\overline{C},\overline{T}} \rvert = 40{,}000$ |

UNSUPERVISED ERROR DETECTION IN DATA TABLES USING SEMANTIC-DOMAIN CONSTRAINTS

BACKGROUND

Recent years have seen an increase in the use of computing devices (e.g., mobile devices, personal computers, server devices) to create, store, edit, and share data. For example, tools and applications for creating data tables and other structured data are increasingly common. As spreadsheet applications, charting applications, business intelligence (BI) products, and other applications that make use of tables (and other structured datasets) become more prevalent, data accuracy within the columns of such structured datasets is of paramount importance.

Conventional techniques for detecting and repairing errors within data table columns feature various pitfalls. For example, existing methods are inefficient because of over-reliance on domain-experts. To illustrate, existing methods rely on domain-experts to manually specify high-quality data-quality constraints that are specific to a given table prior to applying any data-cleaning algorithms. This expert-driven approach leads to high-quality data-cleaning results, but is largely inaccessible to average users. Moreover, these approaches fail to apply to a wide range of datasets and are instead specific to the data tables for which they are designed.

Additionally, existing methods for detecting and repairing errors in data table columns are inflexible. For example, typical data table error approaches require models that are trained on labeled training data. Generating a large corpus of labeled training data is difficult and costly. As such, models used in existing methods are either non-robust or not widely available. Moreover, because of this limited training, these models are difficult to generalize to new and unseen datasets.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

BRIEF DESCRIPTION OF THE DRAWINGS

FIG. 2 illustrates an example data table featuring multiple data errors in accordance with one or more embodiments.

FIG. 6 illustrates an example table of semantic-domain constraints learned by the unsupervised error detection system in accordance with one or more embodiments.

DETAILED DESCRIPTION

Figure 1:
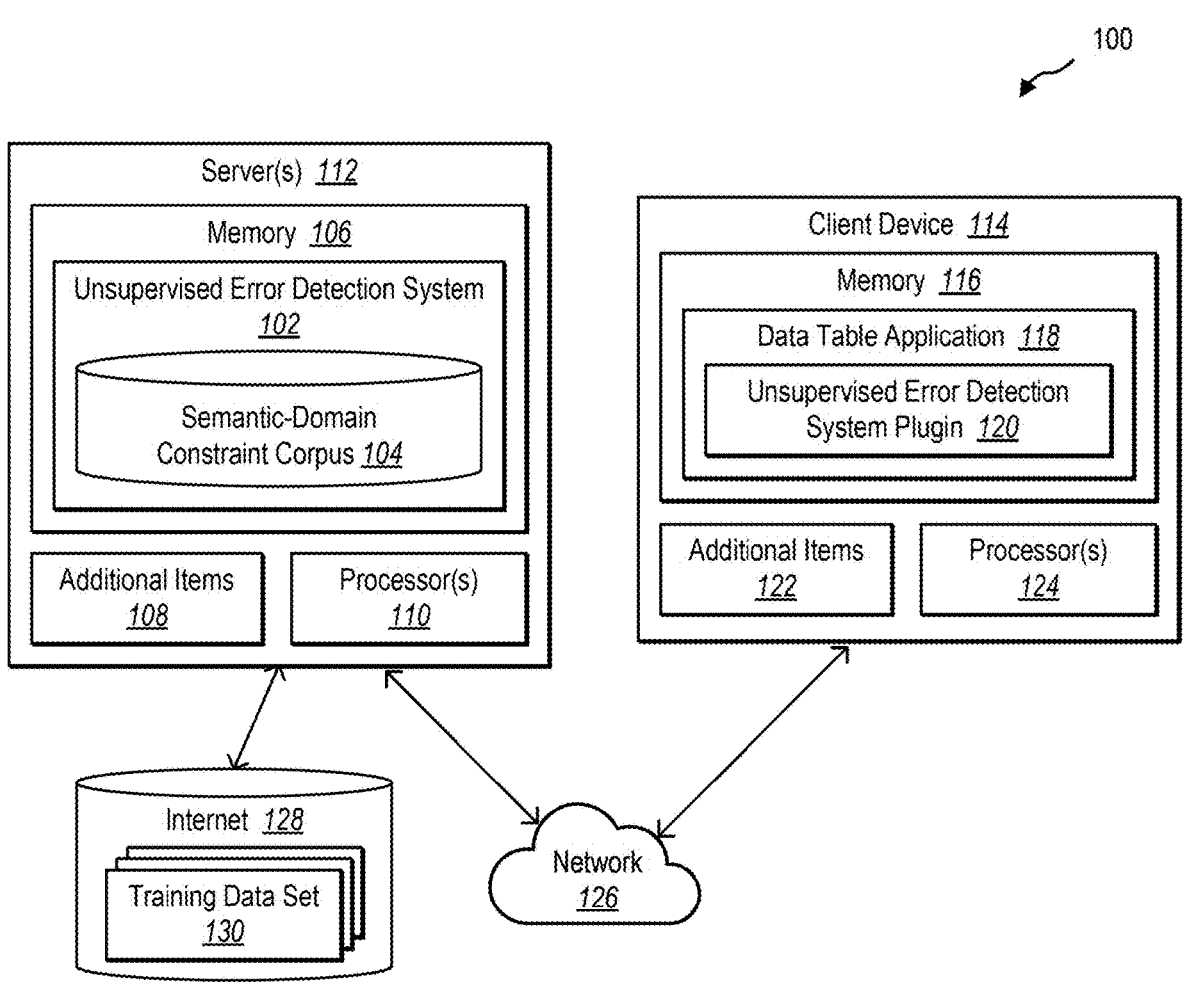
FIG. 1 illustrates an example overview of a digital environment where an unsupervised error detection system operates in connection with a client device to generate and apply a semantic-domain constraint corpus.

The present disclosure relates to systems and methods for generating and leveraging semantic-domain constraints to perform unsupervised error detection in datasets. As discussed above, existing systems for error detection in structured datasets almost exclusively rely on domain-experts to manually specify high-quality data constraints specific to a given table before any additional algorithmic inferences can be performed on that table. As such, existing systems are generally inflexible and inefficient. More than this, existing systems are often inaccessible to general users in connection with a variety of datasets.

To solve these problems, an unsupervised error detection system discussed herein generates a semantic-domain constraint corpus that detects data errors within any table, without requiring domain-experts to manually specify constraints on a per-table basis. As will be discussed in greater detail below, the unsupervised error detection system systematically learns semantic-domain constraints from table corpora using large-scale, automatically designed statistical tests. The unsupervised error detection system further distills these learned semantic-domain constraints into a core set of constraints using an optimization framework with provable quality guarantees. The unsupervised error detection system can then apply this distilled semantic-domain constraint corpus to any structured dataset (e.g., a data table) to identify errors within columns of that dataset.

As such, the unsupervised error detection system discussed herein provides improved flexibility and efficiency over existing systems. For example, the unsupervised error detection system learns the semantic-domain constraint corpus by leveraging diverse column type detection techniques. Accordingly, the semantic-domain constraint corpus includes high-quality data-constraints without relying on the inflexibility of domain-experts working one data table at a time. Moreover, the unsupervised error detection system can further distill and optimize the semantic-domain constraint corpus such that-even when used in connection with very large tables-computational resource usage is less than existing systems.

Additionally, the semantic-domain constraint corpus generated by the unsupervised error detection system presents improvements over the accuracy of existing systems. For example, some existing systems include natural language artificial intelligence features. While these features may increase the flexibility of some existing systems, they are generally inaccurate to specific domain-driven errors within structured datasets. Because the unsupervised error detection system generates the semantic-domain constraint corpus from a vast array of structured datasets, the constraints therein are specific to the types of errors that arise within such structured datasets-leading to error detection accuracy rates that are much higher than even those existing systems that strive for less reliance on human experts.

By generating the semantic-domain constraint corpus from a wide range structured datasets representing an even wider range of data domains, the unsupervised error detection system is also more generalizable than existing systems when used in connection with new and unseen datasets. As discussed above, the unsupervised error detection system generates the semantic-domain constraint corpus to include a robust and efficient set of semantic-domain constraints. Thus, the semantic-domain constraint corpus is generally applicable to almost any structured dataset.

In addition to all the benefits discussed above, the semantic-domain constraint corpus generated by the unsupervised error detection system produces error detection results that are explainable. For example, and as will be discussed in greater detail below, the unsupervised error detection system generates the semantic-domain constraint corpus in a manner that mimics human intuition. As such, the error detection results produced by applying the semantic-domain constraint corpus to a new dataset are easily explainable with fewer false-positives. This—in turn—improves user satisfaction when compared to "black-box" models utilized by existing systems.

In one or more implementations, the methods and steps performed by the unsupervised error detection system reference multiple terms. For example, as referenced herein, a "constraint" generally refers to one or more rules. To illustrate, a data constraint in connection with a dataset can refer to a rule that certain values within that dataset must satisfy. For instance, a column in a dataset may be associated with a constraint dictating that every value within that column be a month of the year in English.

As used herein, a "dataset" refers to a collection of data. Typically, datasets are organized in a structured format like a data table with rows and columns. Often, data within the same column or column domain adheres to the same constraint, as discussed above.

As used herein, a "semantic domain" refers to a specific area of meaning in a language. For example, values within the same semantic domain often share a common theme or concept. As will be discussed in greater detail below, the human mind typically understands concepts based on semantic domains. As such, the unsupervised error detection system discussed herein mimics this human-type of understanding to generate and leverage a semantic-domain constraint corpus.

Figure 3:
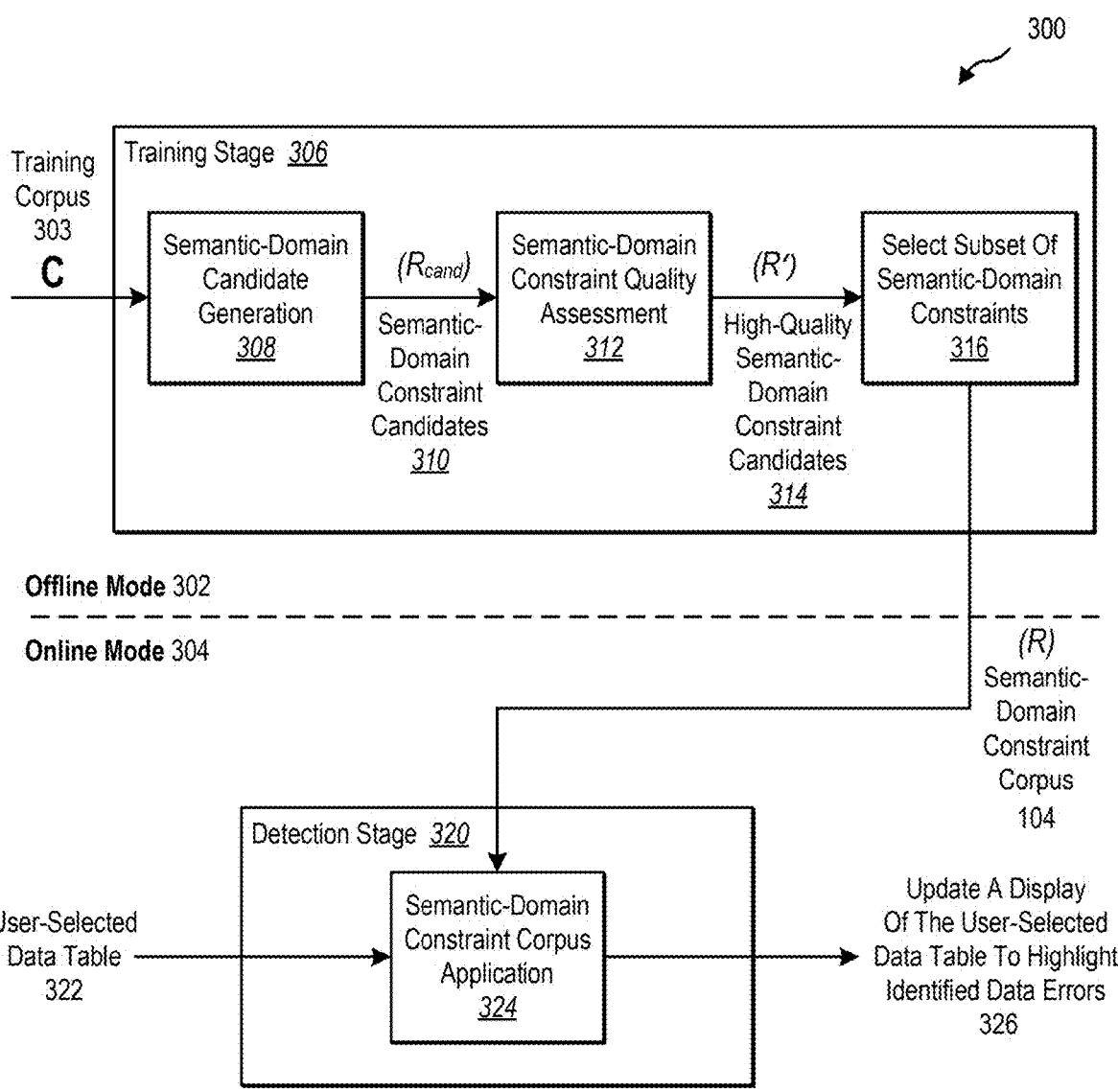
FIG. 3 illustrates an overview diagram of steps performed by the unsupervised error detection system in generating the semantic-domain constraint corpus and applying the semantic-domain constraint corpus to an unknown, user-selected data table in accordance with one or more embodiments.
Figure 4:
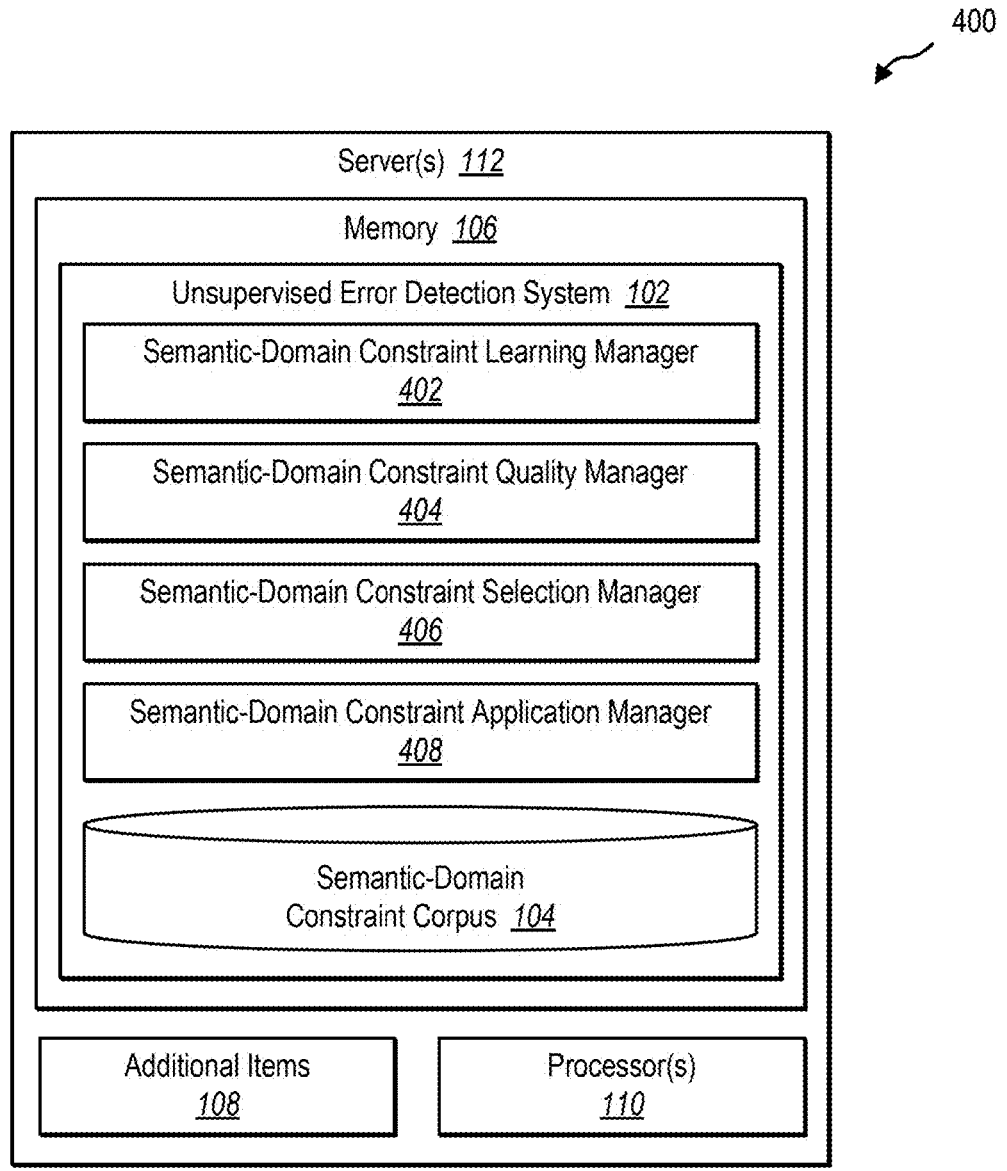
FIG. 4 illustrates a block diagram of the unsupervised error detection system operating within a server in accordance with one or more embodiments.
Figure 5:
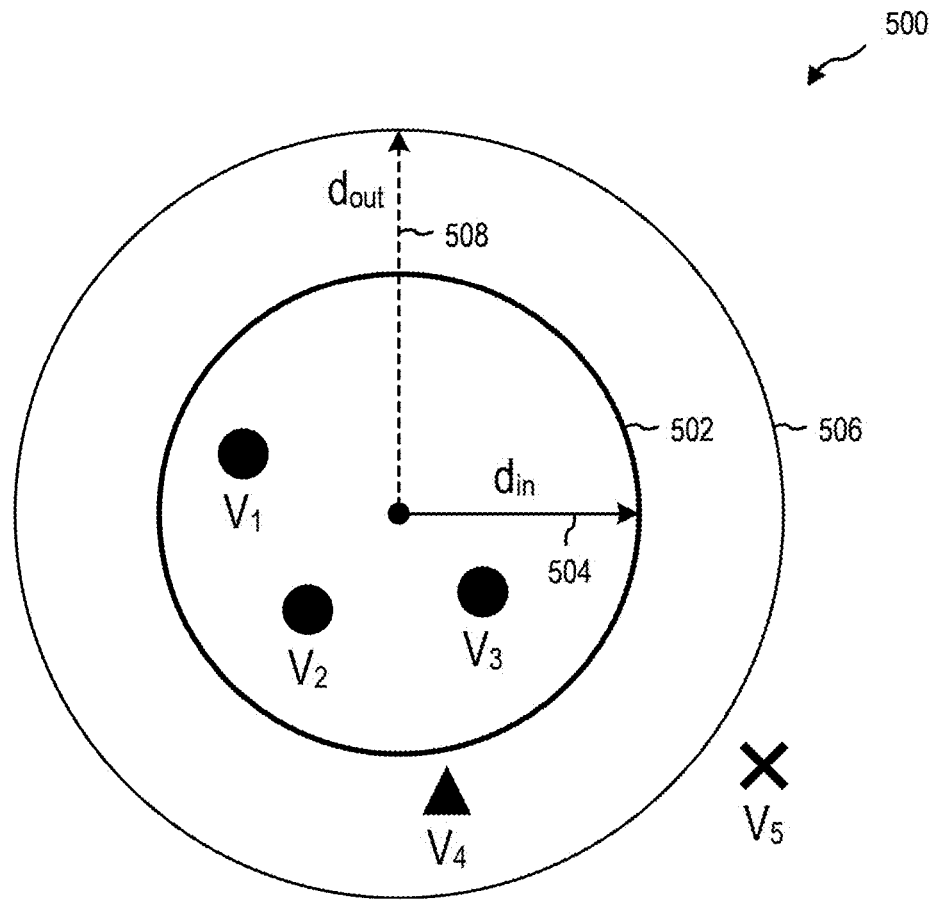
FIG. 5 illustrates a visualization of a semantic-domain constraint in accordance with one or more embodiments.
Figure 7:
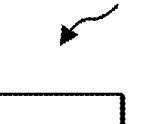
FIG. 7 illustrates an example contingency table associated with a semantic-domain constraint in accordance with one or more embodiments.
Figure 8:
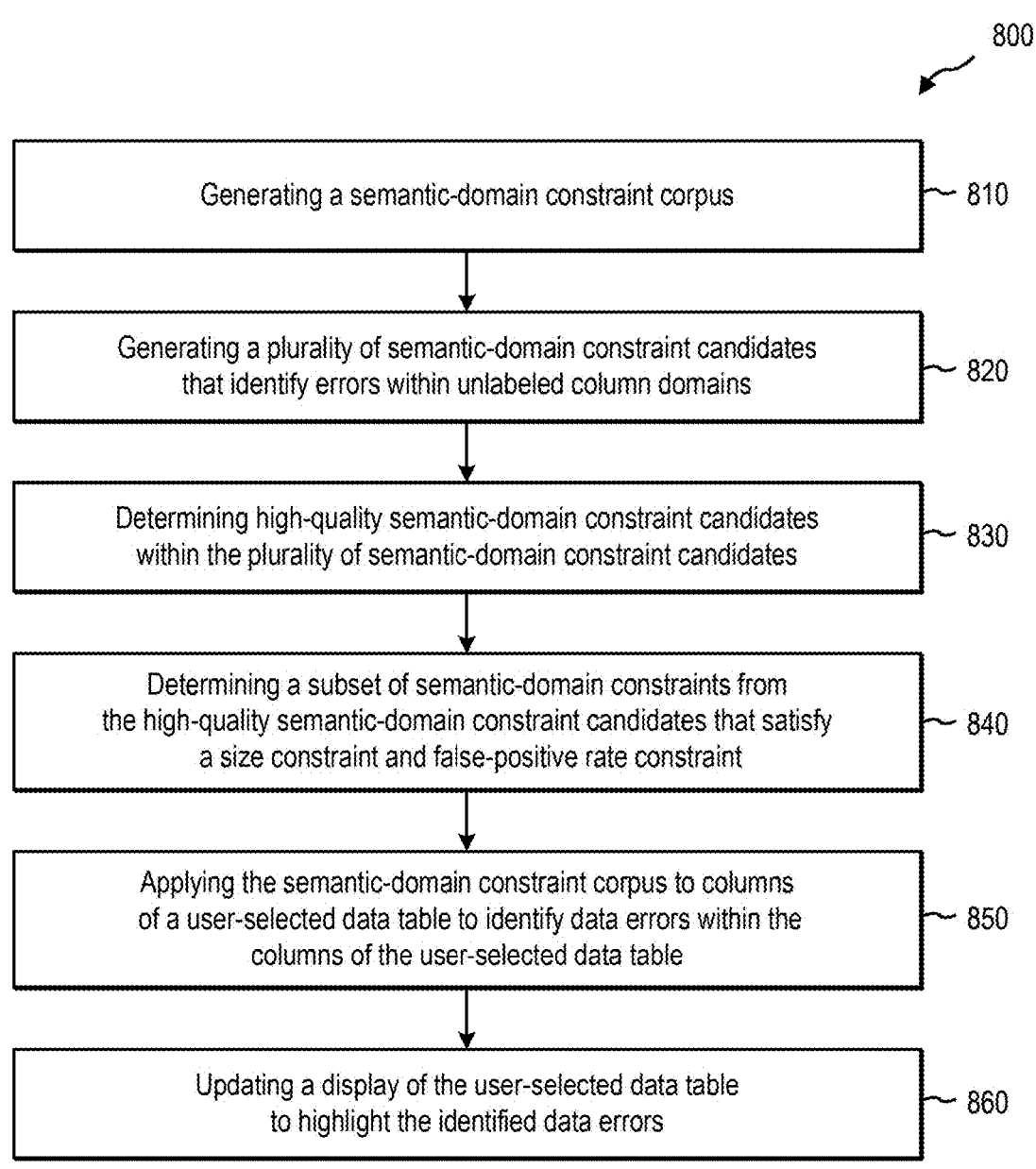
FIG. 8 illustrates a series of acts for generating and applying a semantic-domain constraint corpus in accordance with one or more embodiments.
Figure 9:
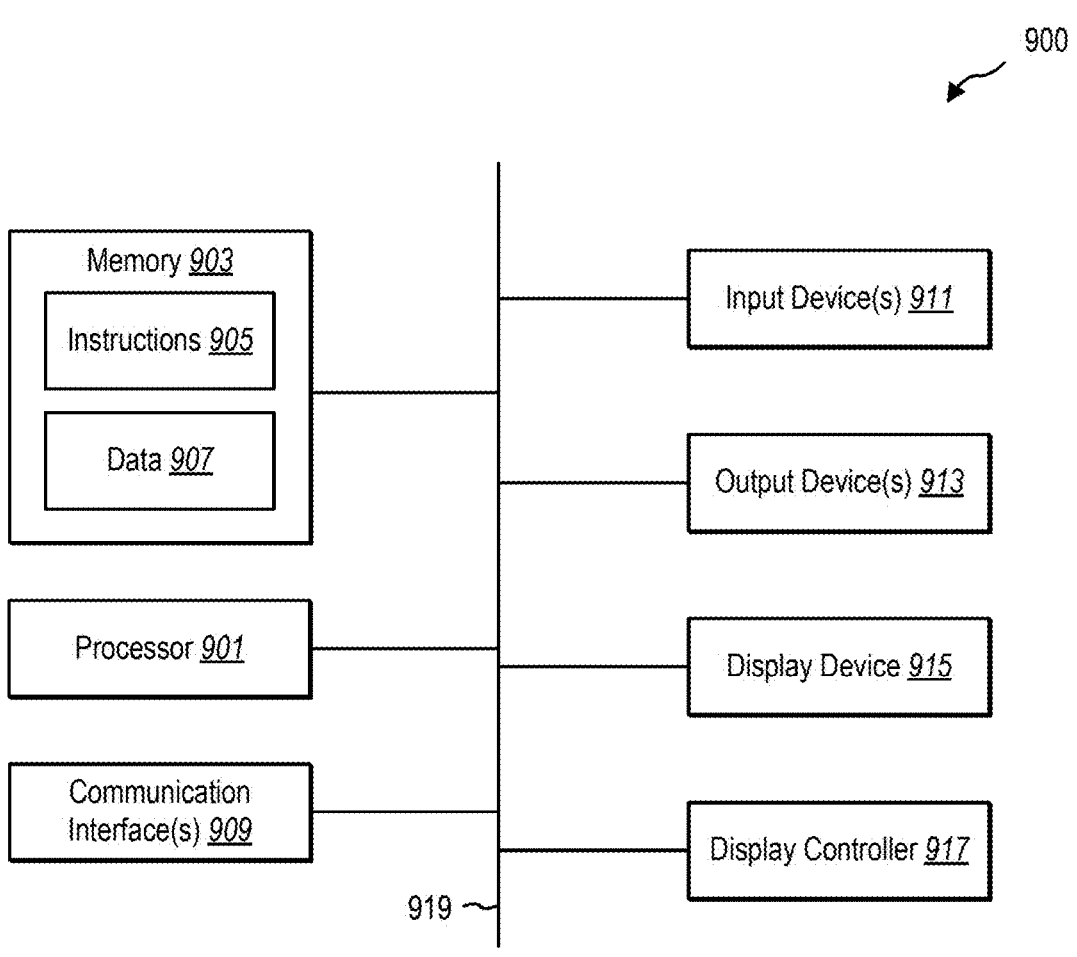
FIG. 9 illustrates certain components that may be included within a computer system in accordance with one or more embodiments.

Additional details regarding example implementations of the unsupervised error detection system will now be discussed in connection with the following figures. To illustrate, FIG. 1 provides an example overview of a networked environment where the unsupervised error detection system operates to generate and apply a semantic-domain constraint corpus. FIG. 2 illustrates an example data table showing multiple data errors that can be identified by a semantic-domain constraint corpus. FIG. 3 illustrates an overview of how the unsupervised error detection system generates the semantic-domain constraint corpus and then applies the semantic-domain constraint corpus to a new dataset. FIG. 4 illustrates additional detail in connection with the unsupervised error detection system. FIGS. 5-7 provide illustrative examples in connection with the description associated with FIG. 4. Finally, FIG. 8 illustrates a series of acts for generating and applying the semantic-domain corpus, while FIG. 9 illustrates certain components that may be included within a computer system.

As just mentioned, FIG. 1 illustrates an example overview environment 100 including an unsupervised error detection system 102 operating within a memory 106 on a server(s) 112. As further shown in FIG. 1, the unsupervised error detection system 102 works in combination with an unsupervised error detection system plugin 120 operating as part of a data table application 118 within a memory 116 on a client device 114. In addition to the memories 106, 116, the server(s) 112 and the client device 114 can also include additional items 108, 122, and processor(s) 110, 124, respectively.

In one or more embodiments, the unsupervised error detection system 102 crawls the Internet 128 to generate a semantic-domain constraint corpus 104 from a training dataset 130. For example, the training dataset 130 can include any of a vast number of publicly available data tables, .csv files, and other structured datasets. In one or more embodiments, the unsupervised error detection system 102 operates under an assumption that the training dataset 130 is largely error-free.

Once the semantic-domain constraint corpus 104 is generated, the unsupervised error detection system 102 can apply the semantic-domain constraint corpus 104 to new, unknown datasets via the unsupervised error detection system plugin 120 operating as part of the data table application 118 on the client device 114.

As further shown in FIG. 1, the unsupervised error detection system 102 and the unsupervised error detection system plugin 120 may be communicatively coupled through the network 126. In one or more implementations, the network 126 may represent any type or form of communication network, such as the Internet, and may include one or more physical connections, such as a LAN, and/or wireless connections, such as a WAN.

Although FIG. 1 illustrates components of the environment 100 in one arrangement, other arrangements are possible. For example, in one embodiment, the unsupervised error detection system 102 may provide error detection services directly to the data table application 118 without the unsupervised error detection system plugin 120 being installed on the client device 114. In that embodiment, the data table application 118 may provide a dataset like a data table to the unsupervised error detection system 102 and the unsupervised error detection system 102 can apply the semantic-domain constraint corpus 104 to the provided dataset. The unsupervised error detection system 102 can then provide instructions to the 118 for updating a display of the dataset to highlight the detected errors.

In yet further embodiments, the unsupervised error detection system 102 may exist as part of the data table application 118. For example, the unsupervised error detection system 102 may be programmed into the data table application 118. Additionally, the overview environment 100 may include any number of client devices 114. Furthermore, in some embodiments, the features and functionality of the unsupervised error detection system 102 may be spread across multiple servers within the environment 100.

FIG. 2 illustrates an example data table 200 featuring multiple errors. For example, the data table 200 includes columns 202a, 202b, 202c, 202d, 202e, 202f, 202g, and 202h, as well as rows 204a, 204b, 204c, 204d, 204e, 204f, 204g, and 204h. Each of the columns 202a-202h are associated with a particular domain. As such, each of the data cells under a particular column should correspond to the same domain. To illustrate, the columns 202a is associated with a country-name domain, the column 202b is associated with a state-code domain, the column 202c is associated with a month domain, the column 202d is associated with a city domain, the column 202e is associated with a fiscal year domain, the column 202f is associated with a unit-weight domain, the column 202g is associated with a date domain, and the column 202h is associated with a URL (Uniform Resource Locator) domain.

As mentioned above, when data is automatically gathered, tables are combined, and other human-driven inconsistencies are introduced into a dataset errors may crop up within columns of a data table. As shown in FIG. 2, some example errors are shown in the data cells 206a, 206b, 206c, 206d, 206e, 206f, 206g, and 206h. For example, within the domain associated with the column 202a (e.g., country-name domain), the data cell 206a features "Liechstein," which is a misspelling of the country "Liechtenstein." Additionally, within the domain associated with the column 202b (e.g., state-code domain), the data cell 206b features "Germany," which is a country rather than a state. Within the domain associated with the column 202c (e.g., month domain), the data cell 206c features "febuary," which is a misspelling of "February." Within the domain associated with the column 202d (e.g., city domain), the data cell 206d features "farimont," which is a misspelling of "Fairmont." Within the domain associated with the column 202e (e.g., fiscal year domain), the data cell 206e features "fy definition," which is likely a default error output of a function. Within the domain associated with the column 202f (e.g., unit-weight domain), the data cell 206f features "0.05%," which is not a unit weight. Within the domain associated with the column 202g (e.g., date domain), the data cell 206g features "new facility," which is not a date. Finally, within the domain associated with the column 202h (e.g., URL domain), the data cell features "/status/799512626703323140," which is only a partial URL.

As such, a wide range of errors may exist within a wide range of column domains. As demonstrated—at least in part—by the data table 200 in FIG. 2, errors may be associated with data type, data format, data placement within a cell, spelling, capitalization, and so forth. Moreover, column domains can include almost anything from dates, countries, weights, URLs, and so forth.

While human domain-experts can use intuition to configure constraints that detect errors such as those illustrated in FIG. 2, the unsupervised error detection system 102 can generate a corpus of semantic-domain constraints that detect errors in structured dataset at the same level of accuracy. But unlike the previous systems discussed above, the unsupervised error detection system 102 makes this high level of error detection available to any level of user without the need for labeled training data. FIG. 3 illustrates an overview diagram 300 of steps performed by the unsupervised error detection system 102 in generating the semantic-domain constraint corpus, and applying the semantic-domain constraint corpus to an unknown, user-selected data table.

As shown in FIG. 3, the unsupervised error detection system 102 can generate the semantic-domain constraint corpus 104 in an offline mode 302. For example, the unsupervised error detection system 102 generates or learns the semantic-domain constraint corpus 104 by first identifying a training corpus 303 (e.g., the training dataset 130 discussed above in connection with FIG. 1). In one or more embodiments, the training corpus 303 can include a variety of unlabeled datasets in a variety of formats. To illustrate, the training corpus 303 can include relational unlabeled tables from real business intelligence models. The training corpus 303 can also include spreadsheet tables extracted from real spreadsheets. The training corpus 303 can additionally include other types of datasets such as comma-separated value (CSV) datasets and so forth.

With the training corpus 303, the unsupervised error detection system 102 moves into a training stage 306 and next performs a step 308 of generating semantic-domain constraint candidates. For example, the unsupervised error detection system 102 can generate the semantic-domain constraint candidates 310 by applying a series of semantic column-type detection methods to the training corpus 303. As will be discussed in greater detail below, the unsupervised error detection system 102 applies a variety of semantic column-type detection methods to the training corpus 303 to generate the semantic-domain constraint candidates 310 where each semantic-domain constraint candidate includes a type (e.g., a domain type, such as a CTA, embedding, pattern, or function), a pre-condition, and a post-condition.

As further shown in FIG. 3, the unsupervised error detection system 102 can also perform a step 312 of assessing semantic-domain constraint candidate quality. For example, the semantic-domain constraint candidates 310 can include many thousands of rules or constraints and some of those rules may be ineffective. To illustrate, the semantic-domain constraint candidates 310 may include rules that lead to false-positives, have low recall (i.e., fail to capture errors in a high number of table columns), operate with low confidence, and so forth. As a result of these determinations, the unsupervised error detection system 102 identifies the high-quality semantic-domain constraints 314 within the semantic-domain constraint candidates 310.

At this point, the set of high-quality semantic-domain constraints 314 may be very large (e.g., over 50 k constraints). Applying a corpus of such a large number of constraints to a user-selected table would be time-consuming as well as computationally inefficient. As such, the unsupervised error detection system 102 can perform a step 316 of selecting a subset of semantic-domain constraints from the high-quality semantic-domain constraints 314 based on certain system-level constraints. For example, and as will be discussed in greater detail below, the unsupervised error detection system 102 selects semantic-domain constraints from the high-quality semantic-domain constraints 314 that satisfy predetermined recall, size, and false-positive rate constraints to generate the semantic-domain constraint corpus 104 with a lower number of highly-applicable, high-quality semantic domain constraints.

With the semantic-domain constraint corpus 104 generated, the unsupervised error detection system 102 can operate in an online mode 304. For example, during a detection stage 320, the unsupervised error detection system 102 can apply the semantic-domain constraint corpus 104 to a user-selected data table 322 (e.g., an unknown or previously unseen data table) in a step 324. As a result of this application, the unsupervised error detection system 102 performs a step 326 of updating a display of the user-selected data table 322 to highlight identified data errors within columns of the user-selected data table. For example, the unsupervised error detection system 102 can update the display such that data cells containing errors are a different color, have a different font, have a different border, etc.

As mentioned above, and as shown in FIG. 4, the unsupervised error detection system 102 generates and applies the semantic-domain constraint corpus 104 to detect errors in structured datasets. FIG. 4 is a block diagram 400 of the unsupervised error detection system 102 operating within the server(s) 112 generating and applying the semantic-domain constraint corpus 104. As such, FIG. 4 provides additional detail with regard to these functions. For example, as shown in FIG. 4, the unsupervised error detection system 102 can include a semantic-domain constraint learning manager 402, a semantic-domain constraint quality manager 404, a semantic-domain constraint selection manager 406, and a semantic-domain constraint application manager 408. In one or more embodiments, these managers 402-408 work together to generate and apply the semantic-domain constraint corpus 104.

In certain implementations, the unsupervised error detection system 102 may represent one or more software applications, modules, or programs that, when executed by a computing device, may cause the computing device to perform one or more tasks. For example, and as will be described in greater detail below, one or more of the semantic-domain constraint learning manager 402, the semantic-domain constraint quality manager 404, the semantic-domain constraint selection manager 406, or the semantic-domain constraint application manager 408 may represent software stored and configured to run on one or more computing devices, such as the server(s) 112. Any of the semantic-domain constraint learning manager 402, the semantic-domain constraint quality manager 404, the semantic-domain constraint selection manager 406, or the semantic-domain constraint application manager 408 shown in FIG. 4 may also represent all or portions of one or more special purpose computers to perform one or more operations.

As mentioned above, and as shown in FIG. 4, the unsupervised error detection system 102 includes the semantic-domain constraint learning manager 402. In one or more embodiments, the semantic-domain constraint learning manager 402 begins the offline mode 302 discussed above by generating a large set of semantic-domain constraint candidates from a wide variety of domains (e.g., the training dataset 130 as shown in FIG. 1 or the training corpus 303 as shown in FIG. 3). For example, each domain typically encompasses several possible subtypes of semantic-domain constraints. To illustrate, the semantic-domain constraint learning manager 402 may generate semantic-domain constraint candidates from domains including column-type annotation (CTA) domains, embedding domains, pattern domains, and embedding domains. In one or more embodiments, each of these domains include techniques to identify the "semantic types" for a given input column C that mimic the intuitive way a human understands a column more than string vs. number (primitive types), but rather a "date," "URL," "city-name," etc. (semantic types). Each of these domains will now be discussed in detail.

CTA-based methods treat column-type detection (e.g., column-type annotation) as a multi-class classification in machine learning that predicts a semantic type (among many candidates) for a given column C. At a conceptual level, a CTA classifier for a semantic type $t_i$, can be viewed as a function $f_{cta}$, that given a value v as input, can produce a score classifier($t_i$, v), to indicate the likelihood of v in type $t_i$. This can be written as:

$$f_{cta}(t_i, v) = CTA\text{-classifier}(t_i, v)$$

For example, this score classifier may give $f_{cta}$("type-country", "Germany")=0.8, and $f_{cta}$("type-city", "Germany")=0.1. As such, $f_{cta}(t_i, v)$ measures the "similarity" between type $t_i$ and value v.

In order to reason with other types of column-type detection methods more consistently, the semantic-domain constraint learning manager 402 standardizes $f_{cta}$ into a "distance version of the same function, written as $$f_{cta}^d :$$

$$f_{cta}^d(t_i, v) = 1 - f_{cta}$$

With this "distance" version of the function $$f_{cta}^d(t_i, v),$$

the semantic-domain constraint learning manager 402 can equivalently have $$f_{cta}^d(\text{"type-country", "Germany"}) = 0.2,$$

and $$f_{cta}^d(\text{"type - city", "Germany"}) = 0.9,$$

where a smaller distance indicates a closer association between value v and type $t_i$.

As mentioned above, the semantic-domain constraint learning manager 402 can also learn semantic-domain constraint candidates using embedding-based methods. In one or more embodiments, such embedding-based methods are vector-based representations of text in natural language processing. In the embedding space, text with similar semantic meanings tend to cluster closely together (e.g., month-names like "January," "February," etc. will be close together in the vector space), while those with unrelated meanings are positioned further apart (e.g., "January" and "February" will be far from color names like "red" and "yellow").

Such embedding provides an effective method to detect semantic types. Specifically, the semantic-domain constraint learning manager 402 may select a random "centroid" (e.g., "January") as a representative of the semantic-type we want to detect—in this case "month-name." Given a column C, if most or all values v∈C fall within a small distance of "January," the semantic-domain constraint learning manager 402 may predict the column C as type "month-name."

Like CTA-classifiers, the semantic-domain constraint learning manager 402 views text-embedding as providing another function $$f_{emb}^d(c_i, v),$$

that calculates the "distance between a given value v and a centroid $c_i$(representing a semantic-type):

$$f_{emb}^d(c_i, v) = dist(emb(c_i), emb(v))$$

For example, let $c_i$="January" be a centroid (representing "month-name"). This may result in $$f_{emb}^d(c_i, \text{"February"}) = 0.1,$$

indicating the close proximity of these two values. Alternatively, let $c_j$="red" be another centroid (representing "color-name"). This may result in $$f_{emb}^d(c_j, \text{"February"}) = 0.7,$$

showing that they are further apart.

As mentioned above, the semantic-domain constraint learning manager 402 can also learn semantic-domain constraint candidates using pattern-based methods. For machine-generated data with syntactic structures (e.g., date, email address, timestamp, etc.), the semantic-domain constraint learning manager 402 can use regex-like patterns to detect semantic types. For example, if most values in column 202$g$ in the data table 200 shown in FIG. 2 follow the pattern "\d{1,2}/\d{1,2}/\d{4}", the semantic-domain constraint learning manager 402 may predict the column as type "date."

Similar to CTA and embedding, for a semantic type implied by pattern $p_i$ (e.g., "\d{1,2}/\d{1,2}/\d{4}" for "date"), and for a given value v, the semantic-domain constraint learning manager 402 can view the pattern-based detection as a different "similarity" function $f_{pat}(p_i, v)$ between value v and a type represented by $p_i$:

$$f_{pat}(p_i, v) = \begin{cases} 1, \text{ if } v \text{ matches } p_i \\ 0, \text{ if } v \text{ does not match } p_i \end{cases}$$

The semantic-domain constraint learning manager 402 also normalizes $f_{pat}(p_i, v)$ into a distance-function $$f_{pat}^d:$$

$$f_{pat}^d(p_i, v) = 1 - f_{pat}(p_i, v)$$

To illustrate, let p="\d{1,2}/\d{1,2}/\d{4}", $v_1$="12/3/2020" and $v_2$="new facility" (e.g., as shown in FIG. 2). The semantic-domain constraint learning manager 402 can determine $$f_{pat}^d(p_i, v_1) = 0$$

indicating "distance=0" between a type represented by p and a compatible value $v_1$. The semantic-domain constraint learning manager 402 can also determine $$f_{pat}^d(p_i, v_2) = 1$$

indicating "distance=1" between p and an incompatible value $v_2$.

As mentioned above, the semantic-domain constraint learning manager 402 can also learn semantic-domain constraint candidates using function-based methods. For example, the semantic-domain constraint learning manager 402 can use "validation-functions" (e.g., in python and other languages) to validate rich semantic data. To demonstrate, values like credit card numbers and UPC codes are known to not be random digits, but rather have internal check-sums and can be validated using special validation-functions. Similarly, dates and timestamps can also be validated more precisely using functions instead of simple patterns. As such, the semantic-domain constraint learning manager 402 can utilize such validation-functions to reliably detect semantic column types.

For each validation-function $f_i$ (to validate a semantic-type), the semantic-domain constraint learning manager 402 can similarly view it as a function $f_{fun}(f_i, v)$, that measures the "similarity" between value v and a type represented by $f_i$:

$$f_{fun}(f_i, v) = \begin{cases} 1, \text{ if } f_i(v) \text{ returns true} \\ 0, \text{ if } f_i(v) \text{ returns false} \end{cases}$$

The semantic-domain constraint learning manager 402 also standardizes this into a distance-function, $$f_{fun}^d$$

$$f_{fun}^d(f_i, v) = 1 - f_{fun}(f_i, v)$$

Where a distance $$f_{fun}^d(f_i, v) = 0$$

indicates that a value v validated true by function $f_i$ may belong to the type represented by $f_i$. To illustrate, let $f_i$ be a "validate_date( )" function. For column 202$g$ in the data table 200 shown in FIG. 2, $$f_{fun}^d(f_i, \text{"12/3/2020"}) + 0,$$

but $$f_{fun}^d(f_i, \text{"new facility"}) = 1.$$

In one or more embodiments, the semantic-domain constraint learning manager 402 generalizes the various column-type detections methods discussed above (e.g., $$f_{cta}^d, f_{emb}^d, f_{pat}^d, \text{ and } f_{fun}^d$$

as "domain-evaluation functions." For example, given a semantic type $t_i$, a domain-evaluation function $f(t_i, v)$ measures the "distance" (or closeness in association) between value v and the domain of type $t_i$, where $f$ can be instantiated using different column-type detection methods discussed herein. As such, $f(t_i, v)$ is designed as a distance-function, where a smaller $f(t_i, v)$ indicates that v is likely "in" the domain of type t, while a larger $f(t_i, v)$ indicates v to be likely "out" of domain of type t.

In one or more embodiments, the semantic-domain constraint learning manager 402 utilizes the domain-evaluation functions $f(t_i, v)$ (described above) to generate semantic-domain constraint candidates. In at least one embodiment, a semantic-domain constraint (SDC), denoted as $r_t=(P, S, c)$ for semantic type t, is a 3-tuple that consists of a pre-condition P, a post-condition S, and a confidence-score c, where:

The pre-condition P evaluates true (in which case $r_t$ applies to C), when the fraction of values $v \in C$ with domain-evaluation function $f_t(v)$ no greater than an inner distance threshold $d_{in}$, denoted as $$\frac{|v|v \in C, f_t(v) \le d_{in}|}{|v|v \in C|},$$

satisfies a matching-percentage m.

The post-condition S, that if the pre-condition P evaluates as true, will detect errors in C as values $v \in C$, whose domain evaluation function $f_t(v)$ evaluates to be greater than an outer distance threshold, $d_{out}$, written as:

$$S(C, f_t, d_{out})=\{v|v \in C, f_t(v) > d_{out}\}$$

The confidence $c \in [0, 1]$, indicating the confidence of the errors detected by the post-condition S above.

To illustrate, FIG. 5 includes a visualization 500 of any semantic-domain constraint $r_t=(P, S, c)$ for a type t. For example, within the visualization 500 an inner ball 502 of radius 504 ($d_{in}$) corresponds to the pre-condition P. Additionally, the outer ball 506 with radius 508 ($d_{out}$) corresponds to the post-condition S.

In more detail, the pre-condition $P(C, f_t, d_{in}, m)$ functions to check whether a given column C is in the semantic domain of the type t (before $r_t$ can apply). Specifically, this pre-condition uses the domain-evaluation function $f_t(v)$ for type t, to calculate the fraction of values $v \in C$ that when evaluated using $f_t(v)$, fall within the inner ball 502 with radius 504 ($d_{in}$)—indicating that those values belong to type t. This can be written as $$\frac{|v|v \in C, f_t(v) \le d_{in}|}{|v|v \in C|}.$$

For example, as shown in FIG. 5, a column C may include the values $\{v_1, v_2, v_3, v_4, v_5\}$. The semantic-domain constraint learning manager 402 may determine that the values $v_1, v_2,$ and $v_3$ fall inside the inner ball 502. The semantic-domain constraint learning manager 402 may further represent this ratio of total values as 3 out 5 values or 0.6 of the total values falling inside the inner ball 502. In response to determining that this ratio or fraction is greater than a pre-determined matching-percentage m, the semantic-domain constraint learning manager 402 can further determine that C is in the domain of type t. In response to this determination, the semantic-domain constraint learning manager 402 can further determine to apply the post-condition S in $r_t$ to C.

The post-condition S (C, $f_t$, $d_{out}$) then functions to check whether there are any values $v \in C$ that fall substantially farther away from the inner ball 502, to be outside of the outer ball 506. This can be written as $S(C, f_t, d_{out})=\{v|v \in C, f_t(v)>d_{out}\}$. If such values exist in C and S is not empty, the semantic-domain constraint learning manager 402 can predict that these values are errors within a confidence score c.

To illustrate, as shown in FIG. 5, the semantic-domain constraint learning manager 402 may determine that the value vs is outside of the outer ball 506. In response to this determination, the semantic-domain constraint learning manager 402 can further predict that the value $v_5$ is an error (since most values in C are determined to belong to type t in the pre-condition P). In one or more embodiments, the semantic-domain constraint learning manager 402 may not predict values such as $v_4$ to be errors when they fall outside the inner ball 502 but inside the outer ball 506. This is to accommodate the fact that many semantic types have domain-boundaries that are "fuzzy."

FIG. 6 illustrates an example table 600 of semantic-domain constraints learned by the semantic-domain constraint learning manager 402 by applying the domain-evaluation functions discussed above. For example, as shown in FIG. 6, each semantic-domain constraint 608*a*, 608*b*, 608*c*, 608*d*, 608*e*, 608*f*, 608*g*, 608*h* has a type 602, a pre-condition 604, and a post-condition 606. To illustrate, each semantic-domain constraint 608*a*-608*h* has a pre-condition: if a matching-percentage 607 of column values in column C, evaluated using a domain evaluation function 610 (e.g., of type 602) satisfy a pre-condition score 612, the semantic-domain constraint 608 (*r*) should apply to the column C. Each semantic-domain constraint 608*a*-608*h* also has a post-condition: any value in column C evaluated using the same domain evaluation function 610 that satisfies a post-condition score 614 is predicted to be a data error. The semantic-domain constraints 608*a*-608*h* shown in FIG. 6 trigger errors like those in data table 200 discussed above in connection with FIG. 2.

To further illustrate, consider semantic-domain constraint 608*d* shown in the table 600 in FIG. 6. The domain evaluation function 610 for the semantic-domain constraint 608*d* is based on "Sentence-BERT" embedding distance and its type t is implied by the centroid "seattle" (therefore of type-city). The pre-condition 604 (P) has an inner-ball radius 504 (e.g., the radius 504 of the inner ball 502) of din=1.2, meaning values within distance 1.2 to "seattle" are likely the same type. Evaluating this semantic-domain constraint 608*d* ($r_4$) against column 202*d* in data table 200 finds 90% of values in column 202*d* to be within the inner ball 502. This is over the required matching-percentage 607 m=80%, ensuring that semantic-domain constraint 608*d* should apply to column 202*d*. Checking two values outside of the inner ball 502 for the column 202*d* (e.g., "shakopee"—an uncommon name, and "farimont"—a typo) finds that "farimont" has a distance greater than $d_{out}$=1.35. As such, "farimont" falls outside of the outer ball 506, as specified by the post-condition 606 (S) for the semantic-domain constraint 608*d*, predicting that "farimont" is likely an error within the column 202*d*. It should be noted that the semantic-domain constraint 608*d* would not apply to any other column in data table 200, as a large enough fraction of values in the additional columns would not satisfy the domain evaluation function 610 for the semantic-domain constraint 608*d* (e.g., would not fall within the inner ball 502 for the semantic-domain constraint 608*d*).

Similarly, another semantic-domain constraint 608*b* based on CTA-classifiers can work to detect the incompatible value "Germany" from the column 202*b* in the data table 200 shown in FIG. 2. The pre-condition 604 for the semantic-domain constraint 608*d* requires a domain evaluation function 610 of "state-classifier" scores>0.55, which would translate to an inner ball 502 radius 504 ($d_{in}$) of 0.45. In response to determining that the column 202*b* has a matching-percentage 607 (*m*) of over 90%, it can be determined that the semantic-domain constraint 608*d* is applicable to the column 202*b*. The value "germany" in the column 202*b* lays outside the outer ball 506 at a radius of $d_{out}$=1−0.05=0.95, making "germany" an error in the column 202*b* that the semantic-domain constraint 608*d* would detect.

As a final example related to FIG. 6, the semantic-domain constraint 608*f* is based on pattern-matching where match=1 and 0 are similarly transformed into distance of 0 and 1, respectively. As such, the radius 504 ($d_{in}$) equals 0 and the radius 508 ($d_{out}$) equals 1. The semantic-domain constraint 608*f* will trigger on the column 202*f* in the data table 200 since over *m*=95% (e.g., as specified by the matching-percentage 607 for the semantic-domain constraint 608*f*) of values match the pattern (and therefore have a distance=0). This positions over 95% of the values in column 202*f* inside the inner ball 502 for the semantic-domain constraint 608*f*. The only non-matching value "0.05%" in the column 202*f* has a distance=1, which falls outside of the outer ball 506 for the semantic-domain constraint 608*f*, meaning the semantic-domain constraint 608*f* would detect this value as an error.

As such, the semantic-domain constraints 608*a*-608*h* learned by the semantic-domain constraint learning manager 402 have many advantages. First, the semantic-domain constraints 608*a*-608*h* mimic the human intuition of identifying data errors. For example, given the data table 200, humans would read values in a data column to first identify the column's semantic type (e.g., city vs. date). Following this a human would use the implicit "domain of possible values" associated with each semantic type to identify possible data errors.

As such, the methodology utilized by the semantic-domain constraint learning manager 402 to learn the semantic-domain constraints 608*a*-608*h* mimics this reasoning process and imposes the "structure" of constraint to restrict the search space of data-quality constraints. As such, the problem reduces to learning good parameters ($d_{in}$, $d_{out}$, *m*). Because the semantic-domain constraints 608*a*-608*h* are based on semantic-domains, the resulting error detections are "explainable" as they are often associated with semantic types. This makes the semantic-domain constraints 608*a*-608*h* easier for non-domain-experts to interpret and utilize. Moreover, even though the semantic-domain constraint learning manager 402 is discussed herein as utilizing a given set of domain evaluation functions, the semantic-domain constraint learning manager 402 is extendable to any number or type of domain evaluation functions. As such, the semantic-domain constraint learning manager 402 makes the unsupervised error detection system 102 even more flexible and accurate.

As mentioned above, and as shown in FIG. 4, the unsupervised error detection system 102 includes the semantic-domain constraint quality manager 404. In one or more embodiments, the semantic-domain constraint learning manager 402 generates the semantic-domain constraint candidates 310 (e.g., the semantic-domain constraints 608*a*-608*h* in the table 600) as a set $R_{cand}$. In most embodiments, most candidates in $R_{cand}$ are ineffective and cannot be directly used for error detection. As such, the semantic-domain constraint quality manager 404 applies several metrics to assess the quality of each semantic-domain constraint in $R_{cand}$ and prune those candidates that fail to meet one or more quality constraints.

In one or more embodiments, the semantic-domain constraint quality manager 404 assumes that a column C is covered by a semantic-domain constraint r if C∈r.pre (as it means that r can be applied to C), and C is said to trigger r if ∃v∈C, v∈r.post (as it means that some value in C satisfies the post-condition of r). Given the training corpus C and a semantic-domain constraint r, the semantic-domain constraint quality manager 404 can partition the columns in C into four disjointed subsets resulting in a contingency table 700 shown in FIG. 7.

For example, as shown in FIG. 7, the semantic-domain constraint quality manager 404 generates the contingency table 700 such that $$|C_{C,T}^r| = 990$$

means that 990 columns are covered (e.g., satisfy the pre-condition) by r (indicated by the subscript C) and do not trigger (e.g., satisfy the post-condition) r (indicated by the subscript T). The other entries in the contingency table 700 are similarly defined. Based on the contingency table 700, the semantic-domain constraint quality manager 404 can assess the quality of a semantic-domain constraint (e.g., any of the semantic-domain constraints 608*a*-608*h*) based on three metrics: 1) the confidence, 2) the effect size, and 3) the significance level. Each of these metrics are now discussed in detail.

The confidence of a semantic-domain constraint r, denoted as r.conf (e.g., a false-positive confidence level), measures how "confident" r is. For example, the more likely a column reported by r is a false-positive, the lower its confidence. Therefore, the false-positive confidence level r.conf is sent to 1 minus the percentage of false-positive columns among the columns covered by r. To estimate this percentage, the semantic-domain constraint quality manager 404 first makes an assumption that all columns in C are error-free. Under this assumption, every reported column (i.e., every column in $$C_{C,T}^r$$

is a false-positive. The confidence of r can be naively estimated as:

$$1 - \frac{|C_{C,T}^r|}{|C_{C,T}^r| + |C_{C,T}^r|'}$$

Using this equation, the confidence of r in the contingency table 700 is $$1 - \frac{10}{10 + 990} = 0.99.$$

This, however, can lead to overestimating the confidence of a portion of semantic-domain constraints. For example, consider a semantic-domain constraint r' with its real confidence r'.conf=0.8. If r' only covers 10 columns in C, with $$|C'_{C,T}| = 0$$

and $$|C'_{C,\overline{T}}| = 10,$$

the computed r.conf would be 1, which is higher than the real confidence.

Overestimating confidence of a semantic-domain constraint can cause columns with low confidence scores to be ranked higher, resulting in more false-positives in the top of the returned list of ranked errors. To avoid overestimating confidence, the semantic-domain constraint quality manager 404 can employ the Wilson score interval to ensure that the estimation is higher than the real confidence with a probability of at least 95%. Specifically, the semantic-domain constraint quality manager 404 estimates r.conf as:

$$1 - \frac{|C^r_{C,T}| + \frac{1}{2}z^2}{|C^r_C| + z^2} - \frac{z}{|C^r_C| + z^2}\sqrt{\frac{|C^r_{C,T}| \cdot |C^r_{C,\overline{T}}|}{|C^r_C|} + \frac{z^2}{4}}$$

Where $$|C^r_C| = |C^r_{C,T}| + |C^r_{C,\overline{T}}|$$

and z=1.65 is the standard normal interval width corresponding to 95% confidence. The confidence of r in the contingency table 700 computed this way is 0.982, which is slightly lower than the 0.99 obtained by the estimation equation discussed above. In one or more embodiments, the semantic-domain constraint quality manager 404 prunes a semantic-domain constraint r from the semantic-domain constraint candidates 310 ($R_{cand}$) if r.conf is below a predetermined threshold (e.g., a threshold of 0.9).

Furthermore, the semantic-domain constraint quality manager 404 can show that the previous assumption is acceptable for semantic-domain constraint confidence estimation. The assumption implies that all columns in $$C^r_{C,T}$$

are false-positives. For example, in contingency table 700, although $$|C^r_{C,T}| = 10,$$

it is possible that among them only 5 columns are real false-positives, corresponding to a real confidence of 0.988 computed by the Wilson score interval, discussed above (recalling that the computed confidence discussed above is 0.982). Therefore, the assumption effectively makes the computed confidence an even more conservative underestimation.

As mentioned above, the semantic-domain constraint quality manager 404 further determines the quality of a semantic-domain constraint r based on the effect size. Ideally, a semantic-domain constraint should have a pre-condition that includes most of the valid values in the corresponding domain, as well as a post-condition that can recognize a large set of values not belonging to the domain. Therefore a high-quality semantic-domain constraint should have two properties: 1) it should be less frequently triggered on the columns it covers, since most values in these columns below to its corresponding domain, and 2) it should be more frequently triggered on the columns it does not cover, since most values in these columns do not belong to its corresponding domain. These two properties imply that for a high-quality semantic-domain constraint, there should be a large discrepancy on the triggering frequency between the columns it covers, and the columns it does not.

As such, the semantic-domain constraint quality manager 404 considers the effect size of a semantic-domain constraint as one of the metrics for determining that constraint's quality. In statistics, the effect size is used to measure the magnitude of difference between two proportions. The more different the two proportions are, the larger the effect size. In the present context, the two proportions correspond to the two sets of columns that are covered/not covered by a semantic-domain constraint. The effect size measures the magnitude of the difference of the semantic-domain constraint's triggering frequency on these two sets. In at least one embodiment, the semantic-domain constraint quality manager 404 utilizes Cohen's h to evaluate the effect size, which is computed as:

$$2\left(\arcsin\sqrt{\frac{|C^r_{\overline{C},T}|}{|C^r_{\overline{C},T}| + |C^r_{\overline{C},\overline{T}}|}} - \arcsin\sqrt{\frac{|C^r_{C,T}|}{|C^r_{C,T}| + |C^r_{C,\overline{T}}|}}\right)$$

For example, the semantic-domain constraint r for the contingency table 700 has an effect size of 2.01, which is relatively large. Indeed, the semantic-domain constraint r triggers on 1% of the columns it covers. In contrast, it has an 80% triggering frequency on the columns it does not cover. In one or more embodiments, the semantic-domain constraint quality manager 404 prunes a semantic-domain constraint from the semantic-domain constraint candidates 310 ($R_{cand}$) if its effect size is below a predetermined threshold (e.g., an effect size of 0.8).

As mentioned above, the semantic-domain constraint quality manager 404 further determines the quality of a semantic-domain constraint r based on its significance level. In statistics, the measurement of effect size is usually accompanied with the measurement of significance level. As such, the semantic-domain constraint quality manager 404 can assess the statistical significance of a semantic-domain constraint by conducting the chi-squared test on its contingency tables. The semantic-domain constraint quality manager 404 can prune all semantic-domain constraints whose p-values exceed a certain threshold from the semantic-domain constraint candidates 310 ($R_{cand}$). In one or more embodiments, the semantic-domain constraint quality manager 404 sets the threshold so that the probability of retaining any statistically insignificant semantic-domain constraint is smaller than 5%.

Thus, the semantic-domain constraint quality manager 404 prunes semantic-domain constraints from the semantic-domain constraint candidates 310 ($R_{cand}$) that fail to satisfy a predetermined confidence level, a predetermined effect size threshold, and the predetermined significance level threshold. The remaining, un-pruned semantic-domain constraints in $R_{cand}$ are the high-quality semantic-domain constraints 314 (R').

As shown in FIG. 4, and as mentioned above, the unsupervised error detection system 102 further includes the semantic-domain constraint selection manager 406. In one or more embodiments, the semantic-domain constraint quality manager 404 prunes low-quality semantic-domain constraints from semantic-domain constraint candidates 310 ($R_{cand}$) to give a set of high-quality semantic-domain constraints 314 (R'). At this point, the size of R' is still large. For example, the size of R' may be over 50,000 constraints. As such, directly applying R' on test columns would likely consume too many computing resources, as well as take too much time as the time complexity grows with the number of semantic-domain constraints. Moreover, such a large R' would also introduce a large number of false-positives.

To address these issues, the semantic-domain constraint selection manager 406 selects the semantic-domain constraint corpus 104 (R) from the high-quality semantic-domain constraints 314 (R') to satisfy both a size constraint and a false-positive rate constraint, while as many columns with errors are detected as possible. In one or more embodiments, the semantic-domain constraint selection manager 406 first estimates the recall and false-positive rate of a semantic-domain constraint. Following this, the semantic-domain constraint selection manager 406 utilizes two different formulations for semantic-domain constraint selection, namely coarse-grained semantic-domain constraint selection (CSS) and fine-grained semantic-domain constraint selection (FSS). All of these steps are discussed in greater detail below.

First, the semantic-domain constraint selection manager 406 can estimate the recall of a semantic-domain constraint. Since the training corpus 303 from which the semantic-domain constraint learning manager 402 learns the semantic-domain constraint candidates 310 is unlabeled, quantifying the recall contributed by each semantic-domain constraint is not straightforward. To overcome this difficulty, the semantic-domain constraint selection manager 406 relies on an unsupervised approach (e.g., distant-supervision) rather than relying on supervised methods that include manually labelling the training corpus 303. In one or more embodiments, the semantic-domain constraint selection manager 406 utilizes distant-supervision to construct a synthetic corpus ($C_{syn}$) that includes a large number of columns (e.g., 80,000 columns) with artificially injected errors.

To create an artificial column, the semantic-domain constraint selection manager 406 first samples a column $C_1$ and selects a value $v \in C_1$. The semantic-domain constraint selection manager 406 then mixes $C_1$ with another sampled column $C_2$ to produce $C'_2 = C_2 \cup \{v\}$. With high probability, $v$ is incompatible with the original values in $C_2$. This will transform $C'_2$ into a "dirty" column with a single outlier $v$ (i.e., $O(C'_2 = \{v\})$). Similar to the rationale employed in distant supervision, it is expected that by building a large volume of imperfect synthesized data the recall contributed by each constraint can be estimated. For example, given the synthesized corpus $C_{syn}$ and a set R of semantic-domain constraints, the semantic-domain constraint selection manager 406 defines the set of columns detectable by R as det(R, $C_{syn}$)={$C \in C_{syn} | \exists r \in R$, o(C, {r})$\in O(C)$}. That is, a column C is detectable by R if some constraint in $r \in R$ detects its injected error.

Additionally, as mentioned above, the semantic-domain constraint selection manager 406 can estimate the false-positive rate of a semantic-domain constraint. In one or more embodiments, the false-positive rate of a semantic-domain constraint r, denoted as $fpr(r)$, is defined as $$\frac{|\{c \in C | o(c, \{r\}) \notin O(c)\}|}{|\{c \in C | O(c) = \{\}\}|}.$$

To estimate the false-positive rate of each semantic-domain constraint, the semantic-domain constraint selection manager 406 assumes that all columns in C are clean and that all reported columns are false-positives. Since the corpus C is a sample from the columns space C, $fpr(r)$ can be estimated without bias using the contingency table of r as:

$$|C^r_{C,T}| / |C|.$$

In reality, some of the columns in $$|C^r_{C,T}| / |C|,$$

which are considered as false-positives in the false-positive rate estimation, are actually true-positives. The semantic-domain constraint selection manager 406 can relax the assumption made above—making the real false-positive rate event lower, and making the estimation given by $$|C^r_{C,T}| / |C|$$

a conservative overestimation. The semantic-domain constraint selection manager 406 can verify by definition that $fpr(R) \le \Sigma_{r \in R} fpr(r)$ for any set R. Therefore, by restricting $\Sigma_{r \in R} fpr(r)$ below the false-positive rate constraint, the semantic-domain constraint selection manager 406 can guarantee that the false-positive rate of the entire set R also satisfies the false-positive rate constraint.

With the recall rate and the false-positive rate of a semantic-domain constraint estimated, the semantic-domain constraint selection manager 406 can next perform coarse-grained semantic-domain constraint selection (CSS) and fine-grained semantic-domain constraint selection (FSS). Each of these selection techniques is now discussed in detail.

Given a synthetic corpus $C_{syn}$ and a set of semantic-domain constraints R', the semantic-domain constraint selection manager 406 utilizes CSS to find a set $R \subseteq R'$ such that R can detect as many errors as possible on $C_{syn}$, subject to a memory budget of $B_{size}$, and a false-positive rate requirement of $B_{FPR}$. Formally:

$$\text{maximize}_{R \subseteq R'} |\det(r, C_{sym})|$$

$$s.t. |R| B_{size}$$

$$\sum_{r \in R} fpr(r) \le B_{FPR}$$

In one or more embodiments, the semantic-domain constraint selection manager 406 operates under the theorem that CSS is NP-hard and cannot be approximated with a factor larger than (1−1/e), unless $NP \subseteq DTIME(n^{O(\log \log n)})$. For example, the semantic-domain constraint selection manager 406 can prove that CSS is NP-hard by reducing from maximum coverage (MC) problem. Since MC cannot be approximated with a factor larger than $(1-1/e)$ unless $NP \subseteq DTIME(n^{O(log\ log\ n)})$, the same conclusion can be drawn on CSS.

In one or more embodiments, the semantic-domain constraint selection manager 406 solves CSS and offers a solution with an approximation ratio of $(1-1/e)$ by first converting the input into an instance of an integer linear programming problem (RSILP). Next, the semantic-domain constraint selection manager 406 calculates the optimal fractional solution of the corresponding linear programming relaxation, called RSLP, of the RSILP. Lastly, the semantic-domain constraint selection manager 406 determines which constraints should be included in R using a randomized rounding scheme. Specifically, the semantic-domain constraint selection manager 406 associates each $r_i \in R'$ with an indicator variable $x_i$, where $x_i=1$ if $r_i$ is selected into R and 0 otherwise. The semantic-domain constraint selection manager 406 associates each column $c_j \in C_{syn}$ with an indicator variable $y_j$, where $y_j=1$ if $c_j \in \det(R, C_{syn})$, and 0 otherwise.

For each $c_j \in C_{syn}$, let $S_j=\{r_i \in R' | o(c_j, \{r\}) \in O(c_j)\}$. The semantic-domain constraint selection manager 406 then formulates the following RSILP:

$$(RSILP)\ \text{maximize} \sum_{c_j \in C_{syn}} y_j$$

$$\text{s.t.} \sum_{r_i \in R'} x_i \le B_{size}$$

$$\sum_{r_i \in R'} fpr(r_i) \cdot x_i \le B_{FPR}$$

$$\sum_{r_i \in S_j} x_i \ge y_j \forall\ c_j \in C_{syn}$$

$$x_i, y_j \in \{0,1\}$$

Given the above RSILP, its corresponding RSLP can be obtained by relaxing the last integral constraint (i.e., $x_i$, $y_j \in \{0,1\}$) to a range constraint (i.e., $x_i$, $y_j \in [0,1]$). Solving RSLP yields the solution for each $x_i$. Then the semantic-domain constraint selection manager 406 initializes an empty set R and selects each $r_i$ into R with a probability $x_i$.

The resulting set of semantic-domain constraints is R and $E(\cap)$ denotes the expectation. Then, $E(|R|) \le B_{size}, E(\Sigma_{r \in R} fpr(r)) \le B_{fpr}$, and $$E(|\det(R, C_{syn})|) \ge \left(1 - \frac{1}{e}\right)OPT,$$

where OPT is the optimal value. To prove this theorem, it is first shown that the original CCS instance and its transformed RSILP instance are equivalent, and a maximum objective is achieved at the same time. Denote the solution obtained by solving RSLP as X $\{x'_i\}$ and Y=$\{y'_j\}$. Since each $r_i$ is selected into R with a probability of $x'_i$, it can be shown that $E(|R|)=E(\Sigma_{r_i \in R} x'i) \le B_{size}$ and $E(\Sigma_{r \in R} fpr(r))$ $E(\Sigma_{r_i \in R} fpr (r_i) \cdot x'_i) \le B_{FPR}$. To prove that $$E(|\det(R, C_{syn})|) \ge \left(1 - \frac{1}{e}\right)OPT,$$

it is first shown that for each $c_j \in C_{syn}$, the probability of $c_j \in \det(R, C_{syn})$ is at least $$\left(1 - \frac{1}{e}\right)y'_j.$$

Therefore, $$E(|\det(R, C_{syn})|) \ge \left(1 - \frac{1}{e}\right)\sum_{c_j \in C_{syn}} y'_j \ge \left(1 - \frac{1}{e}\right)OPT.$$

Although CCS can be solved with a recall guarantee, it does not ensure the consistency of the confidence scores of the reported columns before and after the selection process. That is, for a column c reported by both R and R', cs(c, R) could be significantly lower than cs(c, R'), leading to vastly different ranking of the reported columns. This is undesirable in some scenarios where the user only wants to inspect the top-ranked, highly-confident columns. To address this issue, the semantic-domain constraint selection manager 406 utilizes the second version of constraint selection, namely the fine-grained semantic-domain constraint selection (FSS).

Given a synthetic corpus $C_{syn}$, a parameter $\delta$ and set of semantic-domain constraints R', the semantic-domain constraint selection manager 406 utilizes FSS to find a set $R \subseteq R'$ such that $\det(R, C_{syn})$ is maximized, subject to a memory budget of $B_{size}$ and a false-positive rate requirement of $B_{FPR}$. Besides, for every $c \in \det(R, C_{syn})$, there should be at least one constraint $r \in R$ such that 1) $o(c, \{r\}) \in O(c)$, and 2) $conf(r) \ge cs(c, R')-\delta$. Formally:

$$\text{maximize}_{R \subseteq R'} |\det(R, C_{syn})|$$

$$s.t. |R| \le B_{size}$$

$$\sum_{r \in R} fpr(r) \le B_{FPR}$$

$$\exists r \in R m o(c, \{r\}) \in O(c)$$

$$\text{and } conf(r) \ge cs(c, R')-\delta \forall c \in \det(R, C_{syn})$$

Compared to CSS, the additional constraint in FSS is set to ensure that for every column $c \in \det(R, C_{syn})$, its ground-truth outliers must be reported by a semantic-domain constraint with its confidence consistent with the confidence score of c before constraint selection.

Notably, CSS can be viewed as a special case of FSS where $\delta=1$. Since CSS is an NP-hard problem, FSS is NP-hard as well. In one or more embodiments, the semantic-domain constraint selection manager 406 solves FSS and returns results with an approximation ratio of $(1-1/e)$. In at least one embodiment, the semantic-domain constraint selection manager 406 solves FSS in the same manner as it solves CSS (discussed above), with the only modification being that for each $c_j \in C_{syn}$, $S_j = \{r_i \in R' | o(c_j, \{r_i\}) \in O(c_j)$ and conf $(r_i) \geq cs(c_j, R') - \delta\}$.

The semantic-domain constraint selection manager 406 can demonstrate a performance analysis of FSS that also reveals that for every column in det(R, $C_{syn}$), the column's confidence score is consistent before and after the FSS selection process. For example, if R is the set of semantic-domain constraints returned by the semantic-domain constraint selection manager 406 as a result of the FSS selection process, $E(|R|) \leq B_{size}$, $E(\Sigma_{r \in R} \int pr(r)) \leq B_{fpr}$, and $$E(|\det(R, C_{syn})|) \geq \left(1 - \frac{1}{e}\right) OPT,$$

where OPT is the optimal value. Besides, for every $c - \det(R, C_{syn})$, $cs(c, R) \geq cs(c, R') - \delta$. The proof of $E(|R|) \leq B_{size}$, $E(\Sigma_{r \in R} \int pr(r)) \leq B_{fpr}$, and $$E(|\det(R, C_{syn})|) \geq \left(1 - \frac{1}{e}\right) OPT$$

is similar to the proof discussed above for CSS. To prove the last claim in the theorem above (i.e., $cs(c, R) \geq cs(c, R') - \delta$ for every $c \in \det(R, C_{syn})$), note that $c \in \det(R, C_{syn})$ if and only if there exists some $r \in R$ such that $o(c, \{r\}) \in O(c)$ and conf$(r) \geq cs(c, R') - \delta$. Since $cs(c, R) \geq$conf$(r)$ by its definition, this claim holds.

Thus, at the end of the selection process, the semantic-domain constraint selection manager 406 has generated the semantic-domain constraint corpus 104 including high-quality semantic-domain constraints that satisfy a size constraint (e.g., to minimize computational and run-time requirements) and a false-positive rate constraint (e.g., to ensure that a number of possible false-positive error detections is minimized). With the semantic-domain constraint corpus 104 generated, the unsupervised error detection system 102 has completed the offline mode 302 and can move into the online mode 304.

As mentioned above, and as shown in FIG. 4, the unsupervised error detection system 102 further includes the semantic-domain constraint application manager 408. In one or more embodiments, the semantic-domain constraint application manager 408 operates in the online mode 304 to apply the semantic-domain constraint corpus 104 to a new (e.g., unlearned) data table including columns and values. For example, in some embodiments, the semantic-domain constraint application manager 408 applies the semantic-domain constraint corpus 104 to a user-selected table by applying each semantic-domain constraint in the semantic-domain constraint corpus 104 to each column of the user-selected table. The semantic-domain constraint application manager 408 can then update a display of the user-selected table to include all of the columns reported by the semantic-domain constraints, ranked in decreasing order of their confidence scores.

In one or more embodiments, the semantic-domain constraint application manager 408 can update the display of the user-selected table in more interactive ways. For example, the semantic-domain constraint application manager 408 can generate graphical user interface overlays (e.g., "cards") for each of the identified data errors within the user-selected table. Based on the type of identified data error in each overlay, the semantic-domain constraint application manager 408 can further include one or more suggestions for repairing the error. To illustrate, if the detected error is a spelling mistake, the semantic-domain constraint application manager 408 can generate the overlay including a selectable option to fix the spelling mistake.

The semantic-domain constraint application manager 408 can then include the graphical user interface overlays within the data table display including the user-selected data table. For example, the semantic-domain constraint application manager 408 can include the overlays in ranked order in a window adjacent to the user-selected data table. Additionally, or alternatively, the semantic-domain constraint application manager 408 can highlight table cells in the user-selected data table that correspond to the identified errors within the data table. Then, in response to a detected user-selection of a highlighted table cell, the semantic-domain constraint application manager 408 can update the data table display to show the corresponding overlay adjacent to the selected table cell.

In at least one embodiment, the semantic-domain constraint application manager 408 can further optimize the semantic-domain constraint corpus 104 prior to applying the semantic-domain constraint corpus 104 to a user-selected table. For example, naively applying the full semantic-domain constraint corpus 104 of N semantic-domain constraints to a user-selected table of M columns leads to N*M combinations of constraints and columns. Despite this, in a semantic-domain constraint corpus 104 of one thousand semantic-domain constraints, there may only be 50 semantic-domain constraints with unique pre-conditions (e.g., such as the pre-conditions 604 shown in FIG. 6). In that case, the semantic-domain constraint application manager 408 need only test for the unique pre-conditions. The semantic-domain constraint application manager 408 then only needs to apply post-conditions (e.g., the post-conditions 606 shown in FIG. 6) for those pre-conditions that trigger. This additional optimization of the semantic-domain constraint corpus 104 can lead to further efficiencies in terms of computational resource use and run time.

As further shown in FIG. 4, the server(s) 112 can include additional items 108. In one or more embodiments, the additional items 108 can include data utilized by the unsupervised error detection system 102 in generating and applying the semantic-domain constraint corpus 104. For example, the additional items 108 can include IP addresses associated with client devices accessing the unsupervised error detection system 102 (e.g., such as the client device 114 via the unsupervised error detection system plugin 120 as shown in FIG. 1). The additional items 108 can also include training data such as the training corpus 303 or web addresses of the training datasets 130 available via the Internet 128

In one or more embodiments, the server(s) 112 includes the memory 106 and the processor(s) 110. For example, the memory 106 can generally represent any type or form of volatile or non-volatile storage device or medium capable of storing data and/or computer-readable instructions. In one example, the memory 106 may store, load, and/or maintain one or more components of the unsupervised error detection system 102. Examples of the memory can include, without limitation, Random Access Memory (RAM), Read Only Memory (ROM), flash memory, Hard Disk Drives(HDDs), Solid-State Drives (SSDs), optical disk drives, caches, variations or combinations of one or more of the same, and/or any other suitable storage memory.

Additionally, the processor(s) 110 can generally represent any type or form of hardware-implemented processing units capable of interpreting and/or executing computer-readable instructions. In one implementation, the processor(s) 110 may access and/or modify one or more components of the unsupervised error detection system 102. Examples of the processor(s) 110 include, without limitation, microprocessors, microcontrollers, Central Processing Units (CPUs), Field-Programmable Gate Arrays(FPGAs) that implement softcore processors, Application-Specific Integrated Circuits (ASICs), portions of one or more of the same, variations or combinations of one or more of the same, and/or any other suitable physical processor.

As mentioned above, FIG. 8 illustrates an example series of acts 800 related to generating and applying a semantic-domain constraint corpus (e.g., the semantic-domain constraint corpus 104 discussed above). While FIG. 8 illustrates acts according to one or more embodiments, alternative embodiments may omit, add to, reorder, and/or modify any of the acts shown in FIG. 8. The acts of FIG. 8 can be performed as part of a method. Alternatively, a non-transitory computer-readable medium can include instructions that, when executed by one or more processors, cause a computing device to perform the acts of FIG. 8. In still further embodiments, a system can perform the acts of FIG. 8.

As illustrated in FIG. 8, the series of acts 800 includes an act 810 of generating a semantic-domain constraint corpus. For example, generating the semantic-domain constraint corpus can include the act 820 of generating a plurality of semantic-domain constraint candidates that identify errors within unlabeled column domains. To illustrate, generating the plurality of semantic-domain constraint candidates can include applying semantic column-type detection methods to columns of training data tables to learn the plurality of semantic-domain constraint candidates. In one or more embodiments, each of the plurality of semantic-domain constraint candidates includes a type, a pre-condition, and a post-condition. Additionally, in one or more embodiments, the semantic column-type detection methods include one or more of column-type annotation methods, embedding-based methods, pattern-based methods, or function-based methods.

Additionally, generating the semantic-domain constraint corpus can include the act 830 of determining high-quality semantic-domain constraint candidates within the plurality of semantic-domain constraint candidates. In one or more embodiments, determining high-quality semantic-domain constraint candidates from the plurality of semantic-domain constraint candidates includes determining semantic-domain constraint candidates from the plurality of semantic-domain constraint candidates that: satisfy a false-positive confidence level, satisfy triggering frequencies associated with covered columns and non-covered columns, and have p-values below a predetermined threshold.

Moreover, generating the semantic-domain constraint corpus can include the act 840 of determining a subset of semantic-domain constraints from the high-quality semantic-domain constraint candidates that satisfy a size constraint and false-positive rate constraint. In one or more embodiments, determining the subset of semantic-domain constraints from the high-quality semantic-domain constraint candidates that satisfy the size constraint and the false-positive rate constraint includes: determining semantic-domain constraints from the high-quality semantic-domain constraint candidates that apply to more than a threshold number of columns in the training data tables, and determining semantic-domain constraints from the high-quality semantic-domain constraint candidates that minimize the false-positive rate constraint.

As further shown in FIG. 8, the series of acts 800 further includes an act 850 of applying the semantic-domain constraint corpus to columns of a user-selected data table to identify data errors within the columns of the user-selected data table. In one or more embodiments, the series of acts 800 further includes detecting a user selection of the user-selected data table via a data table display including a listing of unknown data tables.

Finally, as shown in FIG. 8, the series of acts 800 includes an act 860 of updating a display of the user-selected data table to highlight the identified data errors. In one or more embodiments, updating the display of the user-selected data table to highlight to identified data errors includes modifying the data table display to show the user-selected data table, identifying table cells within the user-selected data table that correspond to the identified data errors, and highlighting the identified table cells to indicate the data errors within. In one or more embodiments, the series of acts 800 further includes optimizing the semantic-domain constraint corpus by paring the semantic-domain constraint corpus down to include semantic-domain constraints with unique pre-conditions. Additionally, in one or more embodiments, generating the semantic-domain constraint corpus occurs in an offline mode and applying the semantic-domain constraint corpus occurs in an online mode.

FIG. 9 illustrates certain components that may be included within a computer system 900. One or more computer systems 900 may be used to implement the various devices, components, and systems described herein.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for unsupervised error detection in data tables comprising:

generating a plurality of semantic-domain constraint candidates including rules associated with identifying errors within unlabeled column domains, wherein generating the plurality of semantic-domain constraint candidates includes applying semantic column-type detection methods to columns of training data tables to learn the plurality of semantic-domain constraint candidates, the semantic column-type detection methods including one or more column-type annotation methods, embedding-based methods, pattern-based methods, or function-based methods;

determining high-quality semantic-domain constraint candidates within the plurality of semantic-domain constraint candidates based on a false-positive confidence level determined for each semantic-domain constraint candidate of the plurality of semantic-domain constraint candidates;

determining a subset of semantic-domain constraints from the high-quality semantic-domain constraint candidates that satisfy a plurality of constraints including:

a size constraint associated with a semantic-domain constraint applying to a threshold number of columns from the training data tables; and a false-positive rate constraint associated with a minimum threshold of false positives identified within the training data tables; and causing the subset of semantic-domain constraints to be applied to columns of a user-selected data table to identify data errors within the columns of the user-selected data table; and causing a display of the user-selected data table to be updated to highlight the identified data errors.

2. The method as recited in claim 1, wherein generating the semantic-domain constraint corpus occurs in an offline mode and applying the semantic-domain constraint corpus occurs in an online mode.

3. The method as recited in claim 1, wherein each of the plurality of semantic-domain constraint candidates comprises a domain type, a pre-condition, and a post-condition.

4. The method as recited in claim 1, wherein determining high-quality semantic-domain constraint candidates from the plurality of semantic-domain constraint candidates comprises determining semantic-domain constraint candidates from the plurality of semantic-domain constraint candidates that:

satisfy the false-positive confidence level;

satisfy triggering frequencies associated with covered columns and non-covered columns; and have p-values below a predetermined threshold.

5. The method as recited in claim 1, further comprising detecting a user selection of the user-selected data table via a data table display comprising a listing of unknown data tables.

6. The method as recited in claim 5, wherein causing the display of the user-selected data table to be updated to highlight to identified data errors comprises:

modifying the data table display to show the user-selected data table;

identifying table cells within the user-selected data table that correspond to the identified data errors; and highlighting the identified table cells to indicate the data errors within.

7. The method as recited in claim 3, further comprising optimizing the semantic-domain constraint corpus by paring the semantic-domain constraint corpus down to include semantic-domain constraints with unique pre-conditions.

8. A system comprising:

at least one processor;

memory in electronic communication with the at least one processor; and instructions stored in memory, the instructions being executable by the at least one processor to:

generating a plurality of semantic-domain constraint candidates including rules associated with identifying errors within unlabeled column domains, wherein generating the plurality of semantic-domain constraint candidates includes applying semantic column-type detection methods to columns of training data tables to learn the plurality of semantic-domain constraint candidates, the semantic column-type detection methods including one or more column-type annotation methods, embedding-based methods, pattern-based methods, or function-based methods;

determining high-quality semantic-domain constraint candidates within the plurality of semantic-domain constraint candidates based on a false-positive confidence level determined for each semantic-domain constraint candidate of the plurality of semantic-domain constraint candidates; and determining a subset of semantic-domain constraints from the high-quality semantic-domain constraint candidates that satisfy a plurality of constraints including:

a size constraint associated with a semantic-domain constraint applying to a threshold number of columns from the training data tables; and a false-positive rate constraint associated with a minimum threshold of false positives identified within the training data tables; and causing the subset of semantic-domain constraints to be applied to columns of a user-selected data table to identify data errors within the columns of the user-selected data table; and cause a display of the user-selected data table to be updated to highlight the identified data errors.

9. The system as recited in claim 8, further storing instructions in memory that are executable by the at least one processor to generate the semantic-domain constraint corpus occurs in an offline mode and apply the semantic-domain constraint corpus occurs in an online mode.

10. The system as recited in claim 8, wherein each of the plurality of semantic-domain constraint candidates comprises a domain type, a pre-condition, and a post-condition.

11. The system as recited in claim 8, wherein determining high-quality semantic-domain constraint candidates from the plurality of semantic-domain constraint candidates comprises determining semantic-domain constraint candidates from the plurality of semantic-domain constraint candidates that:

satisfy the false-positive confidence level;

satisfy triggering frequencies associated with covered columns and non-covered columns; and have p-values below a predetermined threshold.

12. The system as recited in claim 8, wherein causing the display of the user-selected data table to be updated to highlight to identified data errors comprises:

modifying the display to show the user-selected data table;

identifying table cells within the user-selected data table that correspond to the identified data errors; and highlighting the identified table cells to indicate the data errors within.

13. The system as recited in claim 12, further storing instructions in memory that are executable by the at least one processor to optimize the semantic-domain constraint corpus by paring the semantic-domain constraint corpus down to include semantic-domain constraints with unique pre-conditions.

14. A method for unsupervised error detection in data tables comprising:

generating a semantic-domain constraint corpus by:

generating a plurality of semantic-domain constraint candidates including rules associated with identifying errors within unlabeled column domains, wherein generating the plurality of semantic-domain constraint candidates includes applying semantic column-type detection methods to columns of training data tables to learn the plurality of semantic-domain constraint candidates, the semantic column-type detection methods including one or more column-type annotation methods, embedding-based methods, pattern-based methods, or function-based methods;

determining high-quality semantic-domain constraint candidates within the plurality of semantic-domain constraint candidates based on a false-positive confidence level determined for each semantic-domain constraint candidate of the plurality of semantic-domain constraint candidates; and determining a subset of semantic-domain constraints from the high-quality semantic-domain constraint candidates that satisfy a plurality of constraints including:

a size constraint associated with a semantic-domain constraint applying to a threshold number of columns from the training data tables; and a false-positive rate constraint associated with a minimum threshold of false positives identified within the training data tables;

causing the semantic-domain constraint corpus to be applied to columns of a user-selected data table to identify data errors within the columns of the user-selected data table;

generating one or more graphical user interface overlays including suggestions associated with the identified data errors within the columns of the user-selected data table; and causing a display of the user-selected data table to be updated to include the one or more graphical user interface overlays in connection with the user-selected data table.

15. The method as recited in claim 14, wherein generating the semantic-domain constraint corpus occurs in an offline mode and applying the semantic-domain constraint corpus occurs in an online mode.

16. The method as recited in claim 14, wherein each of the plurality of semantic-domain constraint candidates comprises a domain type, a pre-condition, and a post-condition.

17. The method as recited in claim 14, wherein determining high-quality semantic-domain constraint candidates from the plurality of semantic-domain constraint candidates comprises determining semantic-domain constraint candidates from the plurality of semantic-domain constraint candidates that:

satisfy the false-positive confidence level;

satisfy triggering frequencies associated with covered columns and non-covered columns; and have p-values below a predetermined threshold.

\* \* \* \* \*